(12) United States Patent
Brockmann et al.

(10) Patent No.: US 10,506,298 B2
(45) Date of Patent: Dec. 10, 2019

(54) CLASS-BASED INTELLIGENT MULTIPLEXING OVER UNMANAGED NETWORKS

(71) Applicant: ACTIVEVIDEO NETWORKS, INC., San Jose, CA (US)

(72) Inventors: Ronald A. Brockmann, Los Gatos, CA (US); Maarten Hoeben, Amersfoort (NL)

(73) Assignee: ACTIVEVIDEO NETWORKS, INC., San Jose, CA (US)

( * ) Notice: Subject to any disclaimer, the term of this patent is extended or adjusted under 35 U.S.C. 154(b) by 0 days.

(21) Appl. No.: 15/791,198

(22) Filed: Oct. 23, 2017

(65) Prior Publication Data

US 2018/0139511 A1    May 17, 2018

Related U.S. Application Data

(63) Continuation of application No. 14/696,463, filed on Apr. 26, 2015, now Pat. No. 9,800,945, which is a
(Continued)

(51) Int. Cl.
*H04N 21/647* (2011.01)
*H04N 21/262* (2011.01)
(Continued)

(52) U.S. Cl.
CPC . *H04N 21/64738* (2013.01); *H04L 29/08954* (2013.01); *H04L 67/322* (2013.01);
(Continued)

(58) Field of Classification Search
CPC ....... H04N 21/2402; H04N 21/234381; H04N 21/23655; H04N 21/44209;
(Continued)

(56) References Cited

U.S. PATENT DOCUMENTS 3,889,050 A    6/1975  Thompson
3,934,079 A    1/1976  Barnhart
(Continued)

FOREIGN PATENT DOCUMENTS

AT    191599 T    4/2000
AT    198969 T    2/2001
(Continued)

OTHER PUBLICATIONS

AC-3 digital audio compression standard, Extract, Dec. 20, 1995, 11 pgs.
(Continued)

*Primary Examiner* — Nathnael Aynalem
(74) *Attorney, Agent, or Firm* — Morgan, Lewis & Bockius LLP

(57) ABSTRACT

A method of adapting content-stream bandwidth includes generating a content stream for transmission over an unmanaged network with varying capacity and sending the content stream toward a client device. The method includes monitoring the capacity of the unmanaged network and determining whether an aggregate bandwidth of an upcoming portion of the content stream fits the capacity. The upcoming portion of the content stream includes video content and user-interface data. The method further includes, in response to a determination that the aggregate bandwidth of the upcoming portion of the content stream does not fit the capacity, prioritizing low latency for the user-interface data over maintaining a frame rate of the video content when the user-interface data is the result of a user interaction and reducing a size of the upcoming portion of the content stream in accordance with the prioritizing. The reducing comprises decreasing the frame rate of the video content.

13 Claims, 11 Drawing Sheets

Multi-Dimensional Control Loop Logic

Related U.S. Application Data continuation-in-part of application No. 13/438,617, filed on Apr. 3, 2012, now Pat. No. 9,204,203.

(60) Provisional application No. 61/984,703, filed on Apr. 25, 2014.

(51) Int. Cl.

| | | |
|---|---|---|
| *H04L 29/08* | (2006.01) | |
| *H04N 21/234* | (2011.01) | |
| *H04N 21/2343* | (2011.01) | |
| *H04N 21/233* | (2011.01) | |
| *H04N 21/24* | (2011.01) | |
| *H04N 21/6583* | (2011.01) | |
| *H04N 21/845* | (2011.01) | |
| *H04N 21/442* | (2011.01) | |
| *H04N 21/6373* | (2011.01) | |
| *H04N 21/6379* | (2011.01) | |

(52) U.S. Cl.
CPC ....... *H04N 21/233* (2013.01); *H04N 21/2335* (2013.01); *H04N 21/23406* (2013.01); *H04N 21/23418* (2013.01); *H04N 21/234345* (2013.01); *H04N 21/234381* (2013.01); *H04N 21/2402* (2013.01); *H04N 21/2407* (2013.01); *H04N 21/26216* (2013.01); *H04N 21/44209* (2013.01); *H04N 21/6373* (2013.01); *H04N 21/6379* (2013.01); *H04N 21/64769* (2013.01); *H04N 21/6583* (2013.01); *H04N 21/8456* (2013.01)

(58) Field of Classification Search
CPC ........... H04N 21/6125; H04N 21/6373; H04N 21/6583; H04N 21/8456; H04N 21/2187; H04N 21/233; H04N 21/2335; H04N 21/23406; H04N 21/23418; H04N 21/2343; H04N 21/234345; H04N 21/234363; H04N 21/23614; H04N 21/2365; H04N 21/2368; H04N 21/2381; H04N 21/2385; H04N 21/2405; H04N 21/2407; H04N 21/26216; H04N 21/278; H04N 21/6118; H04N 21/6175; H04N 21/637; H04N 21/6379; H04N 21/64738; H04N 21/64761; H04N 21/64769; H04N 21/64792; H04N 21/85406; H04N 21/234354; H04N 21/440218; H04N 21/4781; H04N 21/4621; H04N 21/4782; H04L 29/08954; H04L 41/0893; H04L 41/0896; H04L 47/24; H04L 47/521; H04L 65/00; H04L 65/4092; H04L 65/80; H04L 67/32; H04L 65/607; G07F 17/3223
USPC ........................................ 375/240.01–240.29
See application file for complete search history.

(56) References Cited

U.S. PATENT DOCUMENTS

| | | |
|---|---|---|
| 3,997,718 A | 12/1976 | Ricketts et al. |
| 4,002,843 A | 1/1977 | Rackman |
| 4,032,972 A | 6/1977 | Saylor |
| 4,077,006 A | 2/1978 | Nicholson |
| 4,081,831 A | 3/1978 | Tang et al. |
| 4,107,734 A | 8/1978 | Percy et al. |
| 4,107,735 A | 8/1978 | Frohbach |
| 4,145,720 A | 3/1979 | Weintraub et al. |
| 4,168,400 A | 9/1979 | de Couasnon et al. |
| 4,186,438 A | 1/1980 | Benson et al. |
| 4,222,068 A | 9/1980 | Thompson |
| 4,245,245 A | 1/1981 | Matsumoto et al. |
| 4,247,106 A | 1/1981 | Jeffers et al. |
| 4,253,114 A | 2/1981 | Tang et al. |
| 4,264,924 A | 4/1981 | Freeman |
| 4,264,925 A | 4/1981 | Freeman et al. |
| 4,290,142 A | 9/1981 | Schnee et al. |
| 4,302,771 A | 11/1981 | Gargini |
| 4,308,554 A | 12/1981 | Percy et al. |
| 4,350,980 A | 9/1982 | Ward |
| 4,367,557 A | 1/1983 | Stern et al. |
| 4,395,780 A | 7/1983 | Gohm et al. |
| 4,408,225 A | 10/1983 | Ensinger et al. |
| 4,450,477 A | 5/1984 | Lovett |
| 4,454,538 A | 6/1984 | Toriumi |
| 4,466,017 A | 8/1984 | Banker |
| 4,471,380 A | 9/1984 | Mobley |
| 4,475,123 A | 10/1984 | Dumbauld et al. |
| 4,484,217 A | 11/1984 | Block et al. |
| 4,491,983 A | 1/1985 | Pinnow et al. |
| 4,506,387 A | 3/1985 | Walter |
| 4,507,680 A | 3/1985 | Freeman |
| 4,509,073 A | 4/1985 | Baran et al. |
| 4,523,228 A | 6/1985 | Banker |
| 4,533,948 A | 8/1985 | McNamara et al. |
| 4,536,791 A | 8/1985 | Campbell et al. |
| 4,538,174 A | 8/1985 | Gargini et al. |
| 4,538,176 A | 8/1985 | Nakajima et al. |
| 4,553,161 A | 11/1985 | Citta |
| 4,554,581 A | 11/1985 | Tentler et al. |
| 4,555,561 A | 11/1985 | Sugimori et al. |
| 4,562,465 A | 12/1985 | Glaab |
| 4,567,517 A | 1/1986 | Mobley |
| 4,573,072 A | 2/1986 | Freeman |
| 4,591,906 A | 5/1986 | Morales-Garza et al. |
| 4,602,279 A | 7/1986 | Freeman |
| 4,614,970 A | 9/1986 | Clupper et al. |
| 4,616,263 A | 10/1986 | Eichelberger |
| 4,625,235 A | 11/1986 | Watson |
| 4,627,105 A | 12/1986 | Ohashi et al. |
| 4,633,462 A | 12/1986 | Stifle et al. |
| 4,670,904 A | 6/1987 | Rumreich |
| 4,682,360 A | 7/1987 | Frederiksen |
| 4,695,880 A | 9/1987 | Johnson et al. |
| 4,706,121 A | 11/1987 | Young |
| 4,706,285 A | 11/1987 | Rumreich |
| 4,709,418 A | 11/1987 | Fox et al. |
| 4,710,971 A | 12/1987 | Nozaki et al. |
| 4,718,086 A | 1/1988 | Rumreich et al. |
| 4,732,764 A | 3/1988 | Hemingway et al. |
| 4,734,764 A | 3/1988 | Pocock et al. |
| 4,748,689 A | 5/1988 | Mohr |
| 4,749,992 A | 6/1988 | Fitzemeyer et al. |
| 4,750,036 A | 6/1988 | Martinez |
| 4,754,426 A | 6/1988 | Rast et al. |
| 4,760,442 A | 7/1988 | O'Connell et al. |
| 4,763,317 A | 8/1988 | Lehman et al. |
| 4,769,833 A | 9/1988 | Farleigh et al. |
| 4,769,838 A | 9/1988 | Hasegawa |
| 4,789,863 A | 12/1988 | Bush |
| 4,792,849 A | 12/1988 | McCalley et al. |
| 4,801,190 A | 1/1989 | Imoto |
| 4,805,134 A | 2/1989 | Calo et al. |
| 4,807,031 A | 2/1989 | Broughton et al. |
| 4,816,905 A | 3/1989 | Tweedy et al. |
| 4,821,102 A | 4/1989 | Ichikawa et al. |
| 4,823,386 A | 4/1989 | Dumbauld et al. |
| 4,827,253 A | 5/1989 | Maltz |
| 4,827,511 A | 5/1989 | Masuko |
| 4,829,372 A | 5/1989 | McCalley et al. |
| 4,829,558 A | 5/1989 | Welsh |
| 4,847,698 A | 7/1989 | Freeman |
| 4,847,699 A | 7/1989 | Freeman |
| 4,847,700 A | 7/1989 | Freeman |
| 4,848,698 A | 7/1989 | Newell et al. |
| 4,860,379 A | 8/1989 | Schoeneberger et al. |
| 4,864,613 A | 9/1989 | Van Cleave |
| 4,876,592 A | 10/1989 | Von Kohorn |
| 4,889,369 A | 12/1989 | Albrecht |
| 4,890,320 A | 12/1989 | Monslow et al. |

(56) References Cited

U.S. PATENT DOCUMENTS

| | | |
|---|---|---|
| 4,891,694 A | 1/1990 | Way |
| 4,901,367 A | 2/1990 | Nicholson |
| 4,903,126 A | 2/1990 | Kassatly |
| 4,905,094 A | 2/1990 | Pocock et al. |
| 4,912,760 A | 3/1990 | West, Jr. et al. |
| 4,918,516 A | 4/1990 | Freeman |
| 4,920,566 A | 4/1990 | Robbins et al. |
| 4,922,532 A | 5/1990 | Farmer et al. |
| 4,924,303 A | 5/1990 | Brandon et al. |
| 4,924,498 A | 5/1990 | Farmer et al. |
| 4,937,821 A | 6/1990 | Boulton |
| 4,941,040 A | 7/1990 | Pocock et al. |
| 4,947,244 A | 8/1990 | Fenwick et al. |
| 4,961,211 A | 10/1990 | Tsugane et al. |
| 4,963,995 A | 10/1990 | Lang |
| 4,975,771 A | 12/1990 | Kassatly |
| 4,989,245 A | 1/1991 | Bennett |
| 4,994,909 A | 2/1991 | Graves et al. |
| 4,995,078 A | 2/1991 | Monslow et al. |
| 5,003,384 A | 3/1991 | Durden et al. |
| 5,008,934 A | 4/1991 | Endoh |
| 5,014,125 A | 5/1991 | Pocock et al. |
| 5,027,400 A | 6/1991 | Baji et al. |
| 5,051,720 A | 9/1991 | Kittirutsunetorn |
| 5,051,822 A | 9/1991 | Rhoades |
| 5,057,917 A | 10/1991 | Shalkauser et al. |
| 5,058,160 A | 10/1991 | Banker et al. |
| 5,060,262 A | 10/1991 | Bevins, Jr. et al. |
| 5,077,607 A | 12/1991 | Johnson et al. |
| 5,083,800 A | 1/1992 | Lockton |
| 5,088,111 A | 2/1992 | McNamara et al. |
| 5,093,718 A | 3/1992 | Hoarty et al. |
| 5,109,414 A | 4/1992 | Harvey et al. |
| 5,113,496 A | 5/1992 | McCalley et al. |
| 5,119,188 A | 6/1992 | McCalley et al. |
| 5,130,792 A | 7/1992 | Tindell et al. |
| 5,132,992 A | 7/1992 | Yurt et al. |
| 5,133,009 A | 7/1992 | Rumreich |
| 5,133,079 A | 7/1992 | Ballantyne et al. |
| 5,136,411 A | 8/1992 | Paik et al. |
| 5,142,575 A | 8/1992 | Farmer et al. |
| 5,155,591 A | 10/1992 | Wachob |
| 5,172,413 A | 12/1992 | Bradley et al. |
| 5,191,410 A | 3/1993 | McCalley et al. |
| 5,195,092 A | 3/1993 | Wilson et al. |
| 5,208,665 A | 5/1993 | McCalley et al. |
| 5,220,420 A | 6/1993 | Hoarty et al. |
| 5,230,019 A | 7/1993 | Yanagimichi et al. |
| 5,231,494 A | 7/1993 | Wachob |
| 5,236,199 A | 8/1993 | Thompson, Jr. |
| 5,247,347 A | 9/1993 | Letterel et al. |
| 5,253,341 A | 10/1993 | Rozmanith et al. |
| 5,262,854 A | 11/1993 | Ng |
| 5,262,860 A | 11/1993 | Fitzpatrick et al. |
| 5,303,388 A | 4/1994 | Kreitman et al. |
| 5,319,455 A | 6/1994 | Hoarty et al. |
| 5,319,707 A | 6/1994 | Wasilewski et al. |
| 5,321,440 A | 6/1994 | Yanagihara et al. |
| 5,321,514 A | 6/1994 | Martinez |
| 5,351,129 A | 9/1994 | Lai |
| 5,355,162 A | 10/1994 | Yazolino et al. |
| 5,359,601 A | 10/1994 | Wasilewski et al. |
| 5,361,091 A | 11/1994 | Hoarty et al. |
| 5,371,532 A | 12/1994 | Gelman et al. |
| 5,404,393 A | 4/1995 | Remillard |
| 5,408,274 A | 4/1995 | Chang et al. |
| 5,410,343 A | 4/1995 | Coddington et al. |
| 5,410,344 A | 4/1995 | Graves et al. |
| 5,412,415 A | 5/1995 | Cook et al. |
| 5,412,720 A | 5/1995 | Hoarty |
| 5,418,559 A | 5/1995 | Blahut |
| 5,422,674 A | 6/1995 | Hooper et al. |
| 5,422,887 A | 6/1995 | Diepstraten et al. |
| 5,442,389 A | 8/1995 | Blahut et al. |
| 5,442,390 A | 8/1995 | Hooper et al. |
| 5,442,700 A | 8/1995 | Snell et al. |
| 5,446,490 A | 8/1995 | Blahut et al. |
| 5,469,283 A | 11/1995 | Vinel et al. |
| 5,469,431 A | 11/1995 | Wendorf et al. |
| 5,471,263 A | 11/1995 | Odaka |
| 5,481,542 A | 1/1996 | Logston et al. |
| 5,485,197 A | 1/1996 | Hoarty |
| 5,487,066 A | 1/1996 | McNamara et al. |
| 5,493,638 A | 2/1996 | Hooper et al. |
| 5,495,283 A | 2/1996 | Cowe |
| 5,495,295 A | 2/1996 | Long |
| 5,497,187 A | 3/1996 | Banker et al. |
| 5,517,250 A | 5/1996 | Hoogenboom et al. |
| 5,526,034 A | 6/1996 | Hoarty et al. |
| 5,528,281 A | 6/1996 | Grady et al. |
| 5,537,397 A | 7/1996 | Abramson |
| 5,537,404 A | 7/1996 | Bentley et al. |
| 5,539,449 A | 7/1996 | Blahut et al. |
| RE35,314 E | 8/1996 | Logg |
| 5,548,340 A | 8/1996 | Bertram |
| 5,550,578 A | 8/1996 | Hoarty et al. |
| 5,557,316 A | 9/1996 | Hoarty et al. |
| 5,559,549 A | 9/1996 | Hendricks et al. |
| 5,561,708 A | 10/1996 | Remillard |
| 5,570,126 A | 10/1996 | Blahut et al. |
| 5,570,363 A | 10/1996 | Holm |
| 5,579,143 A | 11/1996 | Huber |
| 5,581,653 A | 12/1996 | Todd |
| 5,583,927 A | 12/1996 | Ely et al. |
| 5,587,734 A | 12/1996 | Lauder et al. |
| 5,589,885 A | 12/1996 | Ooi |
| 5,592,470 A | 1/1997 | Rudrapatna et al. |
| 5,594,507 A | 1/1997 | Hoarty |
| 5,594,723 A | 1/1997 | Tibi |
| 5,594,938 A | 1/1997 | Engel |
| 5,596,693 A | 1/1997 | Needle et al. |
| 5,600,364 A | 2/1997 | Hendricks et al. |
| 5,600,573 A | 2/1997 | Hendricks et al. |
| 5,608,446 A | 3/1997 | Carr et al. |
| 5,617,145 A | 4/1997 | Huang et al. |
| 5,621,464 A | 4/1997 | Teo et al. |
| 5,625,404 A | 4/1997 | Grady et al. |
| 5,630,757 A | 5/1997 | Gagin et al. |
| 5,631,693 A | 5/1997 | Wunderlich et al. |
| 5,631,846 A | 5/1997 | Szurkowski |
| 5,632,003 A | 5/1997 | Davidson et al. |
| 5,642,498 A | 6/1997 | Kutner |
| 5,649,283 A | 7/1997 | Galler et al. |
| 5,668,592 A | 9/1997 | Spaulding, II |
| 5,668,599 A | 9/1997 | Cheney et al. |
| 5,708,767 A | 1/1998 | Yeo et al. |
| 5,710,815 A | 1/1998 | Ming et al. |
| 5,712,906 A | 1/1998 | Grady et al. |
| 5,740,307 A | 4/1998 | Lane |
| 5,748,234 A | 5/1998 | Lippincott |
| 5,754,941 A | 5/1998 | Sharpe et al. |
| 5,786,527 A | 7/1998 | Tarte |
| 5,790,174 A | 8/1998 | Richard, III et al. |
| 5,802,283 A | 9/1998 | Grady et al. |
| 5,812,665 A | 9/1998 | Hoarty et al. |
| 5,812,786 A | 9/1998 | Seazholtz et al. |
| 5,815,604 A | 9/1998 | Simons et al. |
| 5,818,438 A | 10/1998 | Howe et al. |
| 5,821,945 A | 10/1998 | Yeo et al. |
| 5,822,537 A | 10/1998 | Katseff et al. |
| 5,828,371 A | 10/1998 | Cline et al. |
| 5,844,594 A | 12/1998 | Ferguson |
| 5,845,083 A | 12/1998 | Hamadani et al. |
| 5,862,325 A | 1/1999 | Reed et al. |
| 5,864,820 A | 1/1999 | Case |
| 5,867,208 A | 2/1999 | McLaren |
| 5,883,661 A | 3/1999 | Hoarty |
| 5,903,727 A | 5/1999 | Nielsen |
| 5,903,816 A | 5/1999 | Broadwin et al. |
| 5,905,522 A | 5/1999 | Lawler |
| 5,907,681 A | 5/1999 | Bates et al. |
| 5,917,822 A | 6/1999 | Lyles et al. |
| 5,946,352 A | 8/1999 | Rowlands et al. |
| 5,952,943 A | 9/1999 | Walsh et al. |

(56) References Cited

U.S. PATENT DOCUMENTS

| | | |
|---|---|---|
| 5,961,603 A | 10/1999 | Kunkel et al. |
| 5,963,203 A | 10/1999 | Goldberg et al. |
| 5,966,163 A | 10/1999 | Lin et al. |
| 5,978,756 A | 11/1999 | Walker et al. |
| 5,982,445 A | 11/1999 | Eyer et al. |
| 5,990,862 A | 11/1999 | Lewis |
| 5,995,146 A | 11/1999 | Rasmussen |
| 5,995,488 A | 11/1999 | Kalhunte et al. |
| 5,999,970 A | 12/1999 | Krisbergh et al. |
| 6,014,416 A | 1/2000 | Shin et al. |
| 6,021,386 A | 2/2000 | Davis et al. |
| 6,031,989 A | 2/2000 | Cordell |
| 6,034,678 A | 3/2000 | Hoarty et al. |
| 6,049,539 A | 4/2000 | Lee et al. |
| 6,049,831 A | 4/2000 | Gardell et al. |
| 6,052,555 A | 4/2000 | Ferguson |
| 6,055,247 A * | 4/2000 | Kubota ............ H04L 12/6418 348/E5.009 |
| 6,055,314 A | 4/2000 | Spies et al. |
| 6,055,315 A | 4/2000 | Doyle et al. |
| 6,064,377 A | 5/2000 | Hoarty et al. |
| 6,078,328 A | 6/2000 | Schumann et al. |
| 6,084,908 A | 7/2000 | Chiang et al. |
| 6,100,883 A | 8/2000 | Hoarty |
| 6,108,625 A | 8/2000 | Kim |
| 6,115,076 A | 9/2000 | Linzer |
| 6,141,645 A | 10/2000 | Chi-Min et al. |
| 6,141,693 A | 10/2000 | Perlman et al. |
| 6,144,698 A | 11/2000 | Poon et al. |
| 6,167,084 A | 12/2000 | Wang et al. |
| 6,177,931 B1 | 1/2001 | Alexander et al. |
| 6,182,072 B1 | 1/2001 | Leak et al. |
| 6,184,878 B1 | 2/2001 | Alonso et al. |
| 6,192,081 B1 | 2/2001 | Chiang et al. |
| 6,198,822 B1 | 3/2001 | Doyle et al. |
| 6,205,582 B1 | 3/2001 | Hoarty |
| 6,226,041 B1 | 5/2001 | Florencio et al. |
| 6,236,730 B1 | 5/2001 | Cowieson et al. |
| 6,243,418 B1 | 6/2001 | Kim |
| 6,253,238 B1 | 6/2001 | Lauder et al. |
| 6,256,047 B1 | 7/2001 | Isobe et al. |
| 6,266,369 B1 | 7/2001 | Wang et al. |
| 6,268,864 B1 | 7/2001 | Chen et al. |
| 6,275,496 B1 | 8/2001 | Burns et al. |
| 6,292,194 B1 | 9/2001 | Powell, III |
| 6,305,020 B1 | 10/2001 | Hoarty et al. |
| 6,310,601 B1 | 10/2001 | Moore et al. |
| 6,317,151 B1 | 11/2001 | Ohsuga et al. |
| 6,317,885 B1 | 11/2001 | Fries |
| 6,349,284 B1 | 2/2002 | Park et al. |
| 6,386,980 B1 | 5/2002 | Nishino et al. |
| 6,389,075 B2 | 5/2002 | Wang et al. |
| 6,446,037 B1 | 9/2002 | Fielder et al. |
| 6,459,427 B1 | 10/2002 | Mao et al. |
| 6,480,210 B1 | 11/2002 | Martino et al. |
| 6,481,012 B1 | 11/2002 | Gordon et al. |
| 6,512,793 B1 | 1/2003 | Maeda |
| 6,536,043 B1 | 3/2003 | Guedalia |
| 6,539,545 B1 | 3/2003 | Dureau et al. |
| 6,557,041 B2 | 4/2003 | Mallart |
| 6,560,496 B1 | 5/2003 | Michnener |
| 6,564,378 B1 | 5/2003 | Satterfield et al. |
| 6,579,184 B1 | 6/2003 | Tanskanen |
| 6,614,442 B1 | 9/2003 | Ouyang et al. |
| 6,625,574 B1 | 9/2003 | Taniguchi et al. |
| 6,645,076 B1 | 11/2003 | Sugai |
| 6,657,647 B1 | 12/2003 | Bright |
| 6,675,385 B1 | 1/2004 | Wang |
| 6,675,387 B1 | 1/2004 | Boucher |
| 6,687,663 B1 | 2/2004 | McGrath et al. |
| 6,717,600 B2 | 4/2004 | Dutta et al. |
| 6,721,956 B2 | 4/2004 | Wsilewski |
| 6,727,929 B1 | 4/2004 | Bates et al. |
| 6,731,605 B1 | 5/2004 | Deshpande |
| 6,747,991 B1 | 6/2004 | Hemy et al. |
| 6,754,271 B1 | 6/2004 | Gordon et al. |
| 6,758,540 B1 | 7/2004 | Adolph et al. |
| 6,766,407 B1 | 7/2004 | Lisitsa et al. |
| 6,771,704 B1 | 8/2004 | Hannah |
| 6,785,902 B1 | 8/2004 | Zigmond et al. |
| 6,807,528 B1 | 10/2004 | Truman et al. |
| 6,810,528 B1 | 10/2004 | Chatani |
| 6,813,690 B1 | 11/2004 | Lango et al. |
| 6,817,947 B2 | 11/2004 | Tanskanen |
| 6,850,490 B1 | 2/2005 | Woo et al. |
| 6,886,178 B1 | 4/2005 | Mao et al. |
| 6,907,574 B2 | 6/2005 | Xu et al. |
| 6,931,291 B1 | 8/2005 | Alvarez-Tinoco et al. |
| 6,941,019 B1 | 9/2005 | Mitchell et al. |
| 6,941,574 B1 | 9/2005 | Broadwin et al. |
| 6,947,509 B1 | 9/2005 | Wong |
| 6,952,221 B1 | 10/2005 | Holtz et al. |
| 6,956,899 B2 | 10/2005 | Hall et al. |
| 7,016,540 B1 | 3/2006 | Gong et al. |
| 7,031,385 B1 | 4/2006 | Inoue et al. |
| 7,050,113 B2 | 5/2006 | Campisano et al. |
| 7,089,577 B1 | 8/2006 | Rakib et al. |
| 7,093,028 B1 | 8/2006 | Shao et al. |
| 7,095,402 B2 | 8/2006 | Kunil et al. |
| 7,114,167 B2 | 9/2006 | Slemmer et al. |
| 7,151,782 B1 | 12/2006 | Oz et al. |
| 7,158,676 B1 | 1/2007 | Rainsford |
| 7,212,573 B2 | 5/2007 | Winger |
| 7,224,731 B2 | 5/2007 | Mehrotra |
| 7,272,556 B1 | 9/2007 | Aguilar et al. |
| 7,310,619 B2 | 12/2007 | Baar et al. |
| 7,325,043 B1 | 1/2008 | Rosenberg et al. |
| 7,346,111 B2 | 3/2008 | Winger et al. |
| 7,412,423 B1 | 8/2008 | Asano |
| 7,412,505 B2 | 8/2008 | Slemmer et al. |
| 7,421,082 B2 | 9/2008 | Kamiya et al. |
| 7,444,306 B2 | 10/2008 | Varble |
| 7,500,235 B2 | 3/2009 | Maynard et al. |
| 7,508,941 B1 | 3/2009 | O'Toole, Jr. et al. |
| 7,512,577 B2 | 3/2009 | Slemmer et al. |
| 7,596,764 B2 | 9/2009 | Vienneau et al. |
| 7,623,575 B2 | 11/2009 | Winger |
| 7,669,220 B2 | 2/2010 | Goode |
| 7,742,609 B2 | 6/2010 | Yeakel et al. |
| 7,743,400 B2 | 6/2010 | Kurauchi |
| 7,751,572 B2 | 7/2010 | Villemoes et al. |
| 7,830,388 B1 | 11/2010 | Lu |
| 7,925,775 B2 * | 4/2011 | Nishida ............ H04L 1/0007 709/232 |
| 7,936,819 B2 | 5/2011 | Craig et al. |
| 7,941,645 B1 | 5/2011 | Riach et al. |
| 7,945,616 B2 | 5/2011 | Zeng et al. |
| 7,987,489 B2 | 7/2011 | Krzyzanowski et al. |
| 8,027,353 B2 | 9/2011 | Damola et al. |
| 8,036,271 B2 | 10/2011 | Winger et al. |
| 8,046,798 B1 | 10/2011 | Schlack et al. |
| 8,074,248 B2 | 12/2011 | Sigmon et al. |
| 8,078,603 B1 | 12/2011 | Chandratillake et al. |
| 8,118,676 B2 | 2/2012 | Craig et al. |
| 8,136,033 B1 | 3/2012 | Bhargava et al. |
| 8,149,917 B2 | 4/2012 | Zhang et al. |
| 8,155,194 B2 | 4/2012 | Winger et al. |
| 8,155,202 B2 | 4/2012 | Landau |
| 8,170,107 B2 | 5/2012 | Winger |
| 8,194,862 B2 | 6/2012 | Herr et al. |
| 8,270,439 B2 | 9/2012 | Herr et al. |
| 8,284,842 B2 | 10/2012 | Craig et al. |
| 8,370,869 B2 | 2/2013 | Paek et al. |
| 8,411,754 B2 | 4/2013 | Zhang et al. |
| 8,442,110 B2 | 5/2013 | Pavlovskaia et al. |
| 8,473,996 B2 | 6/2013 | Gordon et al. |
| 8,619,867 B2 | 12/2013 | Craig et al. |
| 8,656,430 B2 | 2/2014 | Doyle |
| 8,781,240 B2 | 7/2014 | Srinivasan et al. |
| 8,839,317 B1 | 9/2014 | Rieger et al. |
| 8,914,813 B1 | 12/2014 | Sigurdsson et al. |
| 9,204,113 B1 | 12/2015 | Kwok et al. |
| 9,226,018 B1 | 12/2015 | Filippov et al. |
| 9,621,926 B1 | 4/2017 | Lee et al. |

(56) References Cited

U.S. PATENT DOCUMENTS

| | | |
|---|---|---|
| 9,635,440 B2 | 4/2017 | Lacroix |
| 2001/0005360 A1 | 6/2001 | Lee |
| 2001/0008845 A1 | 7/2001 | Kusuda et al. |
| 2001/0027563 A1 | 10/2001 | White et al. |
| 2001/0043215 A1 | 11/2001 | Middleton, III et al. |
| 2001/0049301 A1 | 12/2001 | Masuda et al. |
| 2002/0007491 A1 | 1/2002 | Schiller et al. |
| 2002/0013812 A1 | 1/2002 | Krueger et al. |
| 2002/0016161 A1 | 2/2002 | Dellien et al. |
| 2002/0021353 A1 | 2/2002 | DeNies |
| 2002/0026642 A1 | 2/2002 | Augenbraun et al. |
| 2002/0027567 A1 | 3/2002 | Niamir |
| 2002/0032697 A1 | 3/2002 | French et al. |
| 2002/0040482 A1 | 4/2002 | Sextro et al. |
| 2002/0047899 A1 | 4/2002 | Son et al. |
| 2002/0049975 A1 | 4/2002 | Thomas et al. |
| 2002/0054578 A1 | 5/2002 | Zhang et al. |
| 2002/0056083 A1 | 5/2002 | Istvan |
| 2002/0056107 A1 | 5/2002 | Schlack |
| 2002/0056136 A1 | 5/2002 | Wistendahl et al. |
| 2002/0059644 A1 | 5/2002 | Andrade et al. |
| 2002/0062484 A1 | 5/2002 | De Lange et al. |
| 2002/0067766 A1 | 6/2002 | Sakamoto et al. |
| 2002/0069267 A1 | 6/2002 | Thiele |
| 2002/0072408 A1 | 6/2002 | Kumagai |
| 2002/0078171 A1 | 6/2002 | Schneider |
| 2002/0078456 A1 | 6/2002 | Hudson et al. |
| 2002/0083464 A1 | 6/2002 | Tomsen et al. |
| 2002/0091738 A1 | 7/2002 | Rohrabaugh |
| 2002/0095689 A1 | 7/2002 | Novak |
| 2002/0105531 A1 | 8/2002 | Niemi |
| 2002/0108121 A1 | 8/2002 | Alao et al. |
| 2002/0116705 A1 | 8/2002 | Perlman et al. |
| 2002/0131511 A1 | 9/2002 | Zenoni |
| 2002/0136298 A1 | 9/2002 | Anantharamu et al. |
| 2002/0152318 A1 | 10/2002 | Menon et al. |
| 2002/0171765 A1 | 11/2002 | Waki et al. |
| 2002/0175931 A1 | 11/2002 | Holtz et al. |
| 2002/0178278 A1 | 11/2002 | Ducharme |
| 2002/0178447 A1 | 11/2002 | Plotnick et al. |
| 2002/0188628 A1 | 12/2002 | Cooper et al. |
| 2002/0191851 A1 | 12/2002 | Keinan |
| 2002/0196746 A1 | 12/2002 | Allen |
| 2003/0005452 A1 | 1/2003 | Rodriguez |
| 2003/0020671 A1 | 1/2003 | Santoro et al. |
| 2003/0027517 A1 | 2/2003 | Callway et al. |
| 2003/0035486 A1 | 2/2003 | Kato et al. |
| 2003/0038893 A1 | 2/2003 | Rajamaki et al. |
| 2003/0046690 A1 | 3/2003 | Miller |
| 2003/0051253 A1 | 3/2003 | Barone, Jr. |
| 2003/0058941 A1 | 3/2003 | Chen et al. |
| 2003/0061451 A1 | 3/2003 | Beyda |
| 2003/0065739 A1 | 4/2003 | Shnier |
| 2003/0066093 A1 | 4/2003 | Cruz-Rivera et al. |
| 2003/0071792 A1 | 4/2003 | Safadi |
| 2003/0072372 A1 | 4/2003 | Shen et al. |
| 2003/0088328 A1 | 5/2003 | Nishio et al. |
| 2003/0088400 A1 | 5/2003 | Nishio et al. |
| 2003/0107443 A1 | 6/2003 | Yamamoto |
| 2003/0122836 A1 | 7/2003 | Doyle et al. |
| 2003/0123664 A1 | 7/2003 | Pedlow, Jr. et al. |
| 2003/0126608 A1 | 7/2003 | Safadi |
| 2003/0126611 A1 | 7/2003 | Chernock et al. |
| 2003/0131349 A1 | 7/2003 | Kuczynski-Brown |
| 2003/0135860 A1 | 7/2003 | Dureau |
| 2003/0169373 A1 | 9/2003 | Peters et al. |
| 2003/0177199 A1 | 9/2003 | Zenoni |
| 2003/0188309 A1 | 10/2003 | Yuen |
| 2003/0189980 A1 | 10/2003 | Dvir et al. |
| 2003/0196174 A1 | 10/2003 | Pierre Cote et al. |
| 2003/0208768 A1 | 11/2003 | Urdang et al. |
| 2003/0217360 A1 | 11/2003 | Gordon et al. |
| 2003/0229719 A1 | 12/2003 | Iwata et al. |
| 2003/0229900 A1 | 12/2003 | Reisman |
| 2003/0231218 A1 | 12/2003 | Amadio |
| 2004/0016000 A1 | 1/2004 | Zhang et al. |
| 2004/0034873 A1 | 2/2004 | Zenoni |
| 2004/0040035 A1 | 2/2004 | Carlucci et al. |
| 2004/0055007 A1 | 3/2004 | Allport |
| 2004/0073924 A1 | 4/2004 | Pendakur |
| 2004/0078822 A1 | 4/2004 | Breen et al. |
| 2004/0088375 A1 | 5/2004 | Sethi et al. |
| 2004/0091171 A1 | 5/2004 | Bone |
| 2004/0111526 A1 | 6/2004 | Baldwin et al. |
| 2004/0128686 A1 | 7/2004 | Boyer et al. |
| 2004/0133704 A1 | 7/2004 | Krzyzanowski et al. |
| 2004/0139158 A1 | 7/2004 | Datta |
| 2004/0151385 A1* | 8/2004 | Oneda .................... H04N 19/70 382/232 |
| 2004/0157662 A1 | 8/2004 | Tsuchiya |
| 2004/0163101 A1 | 8/2004 | Swix et al. |
| 2004/0184542 A1 | 9/2004 | Fujimoto |
| 2004/0193648 A1 | 9/2004 | Lai et al. |
| 2004/0210824 A1 | 10/2004 | Shoff et al. |
| 2004/0216045 A1 | 10/2004 | Martin et al. |
| 2004/0261106 A1 | 12/2004 | Hoffman |
| 2004/0261114 A1 | 12/2004 | Addington et al. |
| 2004/0268419 A1 | 12/2004 | Danker et al. |
| 2005/0015259 A1 | 1/2005 | Thumpudi et al. |
| 2005/0015816 A1 | 1/2005 | Christofalo et al. |
| 2005/0021830 A1 | 1/2005 | Urzaiz et al. |
| 2005/0034155 A1* | 2/2005 | Gordon ................ H04N 5/4401 725/39 |
| 2005/0034162 A1 | 2/2005 | White et al. |
| 2005/0042999 A1 | 2/2005 | Rappaport |
| 2005/0044575 A1 | 2/2005 | Der Kuyl |
| 2005/0055685 A1 | 3/2005 | Maynard et al. |
| 2005/0055721 A1 | 3/2005 | Zigmond et al. |
| 2005/0071876 A1 | 3/2005 | van Beek |
| 2005/0076134 A1 | 4/2005 | Bialik et al. |
| 2005/0089091 A1 | 4/2005 | Kim et al. |
| 2005/0091690 A1 | 4/2005 | Delpuch et al. |
| 2005/0091695 A1 | 4/2005 | Paz et al. |
| 2005/0105608 A1 | 5/2005 | Coleman et al. |
| 2005/0114906 A1 | 5/2005 | Hoarty et al. |
| 2005/0135385 A1 | 6/2005 | Jenkins et al. |
| 2005/0141613 A1 | 6/2005 | Kelly et al. |
| 2005/0149988 A1 | 7/2005 | Grannan |
| 2005/0155063 A1 | 7/2005 | Bayrakeri |
| 2005/0160088 A1 | 7/2005 | Scallan et al. |
| 2005/0166257 A1 | 7/2005 | Feinleib et al. |
| 2005/0177853 A1 | 8/2005 | Williams et al. |
| 2005/0180502 A1 | 8/2005 | Puri |
| 2005/0216933 A1 | 9/2005 | Black |
| 2005/0216940 A1 | 9/2005 | Black |
| 2005/0226426 A1 | 10/2005 | Oomen et al. |
| 2005/0232309 A1* | 10/2005 | Kavaler ............ H04L 29/06027 370/519 |
| 2005/0273832 A1 | 12/2005 | Zigmond et al. |
| 2005/0283741 A1 | 12/2005 | Balabanovic et al. |
| 2006/0001737 A1 | 1/2006 | Dawson et al. |
| 2006/0020960 A1 | 1/2006 | Relan et al. |
| 2006/0020994 A1 | 1/2006 | Crane et al. |
| 2006/0026663 A1 | 2/2006 | Kortum et al. |
| 2006/0031906 A1 | 2/2006 | Kaneda |
| 2006/0039481 A1 | 2/2006 | Shen et al. |
| 2006/0041910 A1 | 2/2006 | Hatanaka et al. |
| 2006/0064716 A1 | 3/2006 | Sull et al. |
| 2006/0088105 A1 | 4/2006 | Shen et al. |
| 2006/0095401 A1 | 5/2006 | Krikorian et al. |
| 2006/0095944 A1 | 5/2006 | Demircin et al. |
| 2006/0112338 A1 | 5/2006 | Joung et al. |
| 2006/0117340 A1 | 6/2006 | Pavlovskaia et al. |
| 2006/0161538 A1 | 7/2006 | Kiilerich |
| 2006/0173985 A1 | 8/2006 | Moore |
| 2006/0174021 A1 | 8/2006 | Osborne et al. |
| 2006/0174026 A1 | 8/2006 | Robinson et al. |
| 2006/0174289 A1 | 8/2006 | Theberge |
| 2006/0184614 A1 | 8/2006 | Baratto et al. |
| 2006/0195884 A1 | 8/2006 | van Zoest et al. |
| 2006/0203913 A1 | 9/2006 | Kim et al. |
| 2006/0212203 A1 | 9/2006 | Furuno |
| 2006/0218601 A1 | 9/2006 | Michel |
| 2006/0230428 A1 | 10/2006 | Craig et al. |

(56) References Cited

U.S. PATENT DOCUMENTS

| | | |
|---|---|---|
| 2006/0242570 A1 | 10/2006 | Croft et al. |
| 2006/0267995 A1 | 11/2006 | Radloff et al. |
| 2006/0269086 A1 | 11/2006 | Page et al. |
| 2006/0271985 A1 | 11/2006 | Hoffman et al. |
| 2006/0285586 A1 | 12/2006 | Westerman |
| 2006/0285819 A1 | 12/2006 | Kelly et al. |
| 2007/0009035 A1 | 1/2007 | Craig et al. |
| 2007/0009036 A1 | 1/2007 | Craig et al. |
| 2007/0009042 A1 | 1/2007 | Craig |
| 2007/0011702 A1 | 1/2007 | Vaysman |
| 2007/0043667 A1 | 2/2007 | Qawami et al. |
| 2007/0074251 A1 | 3/2007 | Oguz et al. |
| 2007/0115941 A1 | 5/2007 | Patel et al. |
| 2007/0124282 A1 | 5/2007 | Wittkotter |
| 2007/0124795 A1 | 5/2007 | McKissick et al. |
| 2007/0130446 A1 | 6/2007 | Minakami |
| 2007/0130592 A1 | 6/2007 | Haeusel |
| 2007/0152984 A1 | 7/2007 | Ordin et al. |
| 2007/0162953 A1 | 7/2007 | Bollinger et al. |
| 2007/0172061 A1 | 7/2007 | Pinder |
| 2007/0174790 A1 | 7/2007 | Jing et al. |
| 2007/0180047 A1 | 8/2007 | Dong et al. |
| 2007/0192798 A1 | 8/2007 | Morgan |
| 2007/0234220 A1 | 10/2007 | Khan et al. |
| 2007/0237232 A1 | 10/2007 | Chang et al. |
| 2007/0266412 A1 | 11/2007 | Trowbridge et al. |
| 2007/0300280 A1 | 12/2007 | Turner et al. |
| 2008/0034306 A1 | 2/2008 | Ording |
| 2008/0046373 A1 | 2/2008 | Kim |
| 2008/0046928 A1 | 2/2008 | Poling et al. |
| 2008/0052742 A1 | 2/2008 | Kopf et al. |
| 2008/0060034 A1 | 3/2008 | Egnal et al. |
| 2008/0066135 A1 | 3/2008 | Brodersen et al. |
| 2008/0084503 A1 | 4/2008 | Kondo |
| 2008/0086688 A1 | 4/2008 | Chandratillake et al. |
| 2008/0086747 A1 | 4/2008 | Rasanen et al. |
| 2008/0094368 A1 | 4/2008 | Ording et al. |
| 2008/0097953 A1 | 4/2008 | Levy et al. |
| 2008/0098212 A1 | 4/2008 | Helms et al. |
| 2008/0098450 A1 | 4/2008 | Wu et al. |
| 2008/0104520 A1 | 5/2008 | Swenson et al. |
| 2008/0109556 A1 | 5/2008 | Karlberg |
| 2008/0127255 A1 | 5/2008 | Ress et al. |
| 2008/0144711 A1 | 6/2008 | Chui et al. |
| 2008/0154583 A1 | 6/2008 | Goto et al. |
| 2008/0163286 A1 | 7/2008 | Rudolph et al. |
| 2008/0170619 A1 | 7/2008 | Landau |
| 2008/0170622 A1 | 7/2008 | Gordon et al. |
| 2008/0172441 A1 | 7/2008 | Speicher et al. |
| 2008/0178125 A1 | 7/2008 | Elsbree et al. |
| 2008/0178243 A1 | 7/2008 | Dong et al. |
| 2008/0178249 A1 | 7/2008 | Gordon et al. |
| 2008/0181221 A1 | 7/2008 | Kampmann et al. |
| 2008/0184120 A1 | 7/2008 | O-Brien-Strain et al. |
| 2008/0189740 A1 | 8/2008 | Carpenter et al. |
| 2008/0195573 A1 | 8/2008 | Onoda et al. |
| 2008/0201736 A1 | 8/2008 | Gordon et al. |
| 2008/0212942 A1 | 9/2008 | Gordon et al. |
| 2008/0222199 A1 | 9/2008 | Tiu et al. |
| 2008/0232243 A1 | 9/2008 | Oren et al. |
| 2008/0232452 A1 | 9/2008 | Sullivan et al. |
| 2008/0243918 A1 | 10/2008 | Holtman |
| 2008/0243998 A1 | 10/2008 | Oh et al. |
| 2008/0244681 A1 | 10/2008 | Gossweiler et al. |
| 2008/0253440 A1 | 10/2008 | Srinivasan et al. |
| 2008/0253685 A1 | 10/2008 | Kuranov et al. |
| 2008/0271080 A1 | 10/2008 | Grossweiler et al. |
| 2009/0003446 A1 | 1/2009 | Wu et al. |
| 2009/0003705 A1 | 1/2009 | Zou et al. |
| 2009/0007199 A1 | 1/2009 | La Joie |
| 2009/0025027 A1 | 1/2009 | Craner |
| 2009/0031341 A1 | 1/2009 | Schlack et al. |
| 2009/0041118 A1 | 2/2009 | Pavlovskaia et al. |
| 2009/0083781 A1 | 3/2009 | Yang et al. |
| 2009/0083813 A1 | 3/2009 | Dolce et al. |
| 2009/0083824 A1 | 3/2009 | McCarthy et al. |
| 2009/0089188 A1 | 4/2009 | Ku et al. |
| 2009/0094113 A1 | 4/2009 | Berry et al. |
| 2009/0094646 A1 | 4/2009 | Walter et al. |
| 2009/0100465 A1 | 4/2009 | Kulakowski |
| 2009/0100489 A1 | 4/2009 | Strothmann |
| 2009/0106269 A1 | 4/2009 | Zuckerman et al. |
| 2009/0106386 A1 | 4/2009 | Zuckerman et al. |
| 2009/0106392 A1 | 4/2009 | Zuckerman et al. |
| 2009/0106425 A1 | 4/2009 | Zuckerman et al. |
| 2009/0106441 A1 | 4/2009 | Zuckerman et al. |
| 2009/0106451 A1 | 4/2009 | Zuckerman et al. |
| 2009/0106511 A1 | 4/2009 | Zuckerman et al. |
| 2009/0113009 A1 | 4/2009 | Slemmer et al. |
| 2009/0132942 A1 | 5/2009 | Santoro et al. |
| 2009/0138966 A1 | 5/2009 | Krause et al. |
| 2009/0144781 A1 | 6/2009 | Glaser et al. |
| 2009/0146779 A1 | 6/2009 | Kumar et al. |
| 2009/0157868 A1 | 6/2009 | Chaudhry |
| 2009/0158369 A1 | 6/2009 | Van Vleck et al. |
| 2009/0160694 A1 | 6/2009 | Di Flora |
| 2009/0172431 A1 | 7/2009 | Gupta et al. |
| 2009/0172726 A1 | 7/2009 | Vantalon et al. |
| 2009/0172757 A1 | 7/2009 | Aldrey et al. |
| 2009/0178098 A1 | 7/2009 | Westbrook et al. |
| 2009/0183197 A1 | 7/2009 | Matthews |
| 2009/0183219 A1 | 7/2009 | Maynard et al. |
| 2009/0189890 A1 | 7/2009 | Corbett et al. |
| 2009/0193452 A1 | 7/2009 | Russ et al. |
| 2009/0196346 A1 | 8/2009 | Zhang et al. |
| 2009/0204920 A1 | 8/2009 | Beverly et al. |
| 2009/0210899 A1 | 8/2009 | Lawrence-Apfelbaum et al. |
| 2009/0225790 A1 | 9/2009 | Shay et al. |
| 2009/0228620 A1 | 9/2009 | Thomas et al. |
| 2009/0228922 A1 | 9/2009 | Haj-Khalil et al. |
| 2009/0233593 A1 | 9/2009 | Ergen et al. |
| 2009/0251478 A1 | 10/2009 | Maillot et al. |
| 2009/0254960 A1 | 10/2009 | Yarom et al. |
| 2009/0265617 A1 | 10/2009 | Randall et al. |
| 2009/0265746 A1 | 10/2009 | Halen et al. |
| 2009/0271818 A1 | 10/2009 | Schlack |
| 2009/0298535 A1 | 12/2009 | Klein et al. |
| 2009/0313674 A1 | 12/2009 | Ludvig et al. |
| 2009/0316709 A1 | 12/2009 | Polcha et al. |
| 2009/0328109 A1 | 12/2009 | Pavlovskaia et al. |
| 2010/0009623 A1 | 1/2010 | Hennenhoefer et al. |
| 2010/0033638 A1 | 2/2010 | O'Donnell et al. |
| 2010/0035682 A1 | 2/2010 | Gentile et al. |
| 2010/0054268 A1 | 3/2010 | Divivier |
| 2010/0058404 A1 | 3/2010 | Rouse |
| 2010/0067571 A1 | 3/2010 | White et al. |
| 2010/0073371 A1 | 3/2010 | Ernst et al. |
| 2010/0077441 A1 | 3/2010 | Thomas et al. |
| 2010/0104021 A1 | 4/2010 | Schmit |
| 2010/0115573 A1 | 5/2010 | Srinivasan et al. |
| 2010/0118972 A1 | 5/2010 | Zhang et al. |
| 2010/0131411 A1 | 5/2010 | Jogand-Coulomb et al. |
| 2010/0131996 A1 | 5/2010 | Gauld |
| 2010/0146139 A1 | 6/2010 | Brockmann |
| 2010/0153885 A1 | 6/2010 | Yates |
| 2010/0158109 A1* | 6/2010 | Dahlby .............. H04N 7/17318 375/240.03 |
| 2010/0161825 A1 | 6/2010 | Ronca et al. |
| 2010/0166062 A1 | 7/2010 | Perlman et al. |
| 2010/0166071 A1 | 7/2010 | Wu et al. |
| 2010/0174776 A1 | 7/2010 | Westberg et al. |
| 2010/0175080 A1 | 7/2010 | Yuen et al. |
| 2010/0180307 A1 | 7/2010 | Hayes et al. |
| 2010/0211983 A1 | 8/2010 | Chou |
| 2010/0226428 A1 | 9/2010 | Thevathasan et al. |
| 2010/0235861 A1 | 9/2010 | Schein et al. |
| 2010/0242073 A1 | 9/2010 | Gordon et al. |
| 2010/0251167 A1 | 9/2010 | DeLuca et al. |
| 2010/0254370 A1 | 10/2010 | Jana et al. |
| 2010/0265344 A1 | 10/2010 | Velarde et al. |
| 2010/0325655 A1 | 12/2010 | Perez |
| 2010/0325668 A1 | 12/2010 | Young et al. |
| 2011/0002376 A1 | 1/2011 | Ahmed et al. |
| 2011/0002470 A1 | 1/2011 | Purnhagen et al. |

(56) References Cited

U.S. PATENT DOCUMENTS

| | | |
|---|---|---|
| 2011/0023069 A1 | 1/2011 | Dowens |
| 2011/0035227 A1 | 2/2011 | Lee et al. |
| 2011/0040894 A1 | 2/2011 | Shrum, Jr. et al. |
| 2011/0067061 A1 | 3/2011 | Karaoguz et al. |
| 2011/0072474 A1 | 3/2011 | Springer et al. |
| 2011/0099594 A1 | 4/2011 | Chen et al. |
| 2011/0107375 A1 | 5/2011 | Stahl et al. |
| 2011/0110433 A1 | 5/2011 | Bjontegaard |
| 2011/0110642 A1 | 5/2011 | Salomons et al. |
| 2011/0150421 A1 | 6/2011 | Sasaki et al. |
| 2011/0153776 A1 | 6/2011 | Opala et al. |
| 2011/0161517 A1 | 6/2011 | Ferguson |
| 2011/0167468 A1 | 7/2011 | Lee et al. |
| 2011/0173590 A1 | 7/2011 | Yanes |
| 2011/0191684 A1 | 8/2011 | Greenberg |
| 2011/0202948 A1 | 8/2011 | Bildgen et al. |
| 2011/0211591 A1 | 9/2011 | Traub et al. |
| 2011/0231878 A1 | 9/2011 | Hunter et al. |
| 2011/0258584 A1 | 10/2011 | Williams et al. |
| 2011/0261889 A1 | 10/2011 | Francisco |
| 2011/0283304 A1 | 11/2011 | Roberts |
| 2011/0289536 A1 | 11/2011 | Poder et al. |
| 2011/0296312 A1 | 12/2011 | Boyer et al. |
| 2011/0317982 A1 | 12/2011 | Xu et al. |
| 2012/0008786 A1 | 1/2012 | Cronk et al. |
| 2012/0023126 A1 | 1/2012 | Jin et al. |
| 2012/0023250 A1 | 1/2012 | Chen et al. |
| 2012/0030212 A1 | 2/2012 | Koopmans et al. |
| 2012/0030706 A1 | 2/2012 | Hulse et al. |
| 2012/0092443 A1 | 4/2012 | Mauchly |
| 2012/0137337 A1 | 5/2012 | Sigmon et al. |
| 2012/0204217 A1 | 8/2012 | Regis et al. |
| 2012/0209815 A1 | 8/2012 | Carson et al. |
| 2012/0216232 A1 | 8/2012 | Chen et al. |
| 2012/0221853 A1 | 8/2012 | Wingert et al. |
| 2012/0224641 A1 | 9/2012 | Haberman et al. |
| 2012/0257671 A1 | 10/2012 | Brockmann et al. |
| 2012/0271920 A1 | 10/2012 | Isaksson |
| 2012/0284753 A1 | 11/2012 | Roberts et al. |
| 2012/0297081 A1 | 11/2012 | Karlsson et al. |
| 2013/0003826 A1 | 1/2013 | Craig et al. |
| 2013/0042271 A1 | 2/2013 | Yellin et al. |
| 2013/0046863 A1 | 2/2013 | Bastian et al. |
| 2013/0047074 A1 | 2/2013 | Vestergaard et al. |
| 2013/0071095 A1 | 3/2013 | Chauvier et al. |
| 2013/0086610 A1 | 4/2013 | Brockmann |
| 2013/0132986 A1 | 5/2013 | Mack et al. |
| 2013/0179787 A1 | 7/2013 | Brockmann et al. |
| 2013/0198776 A1 | 8/2013 | Brockmann |
| 2013/0254308 A1 | 9/2013 | Rose et al. |
| 2013/0254675 A1 | 9/2013 | de Andrade |
| 2013/0272394 A1 | 10/2013 | Brockmann et al. |
| 2013/0276015 A1 | 10/2013 | Rothschild |
| 2013/0283318 A1 | 10/2013 | Wannamaker |
| 2013/0297887 A1 | 11/2013 | Woodward et al. |
| 2013/0304818 A1 | 11/2013 | Brumleve et al. |
| 2013/0305051 A1 | 11/2013 | Fu et al. |
| 2014/0032635 A1 | 1/2014 | Pimmel et al. |
| 2014/0033036 A1 | 1/2014 | Gaur et al. |
| 2014/0081954 A1 | 3/2014 | Elizarov |
| 2014/0089469 A1 | 3/2014 | Ramamurthy et al. |
| 2014/0123169 A1 | 5/2014 | Koukarine et al. |
| 2014/0157298 A1 | 6/2014 | Murphy |
| 2014/0168515 A1 | 6/2014 | Sagliocco et al. |
| 2014/0223307 A1 | 8/2014 | McIntosh et al. |
| 2014/0223482 A1 | 8/2014 | McIntosh et al. |
| 2014/0267074 A1 | 9/2014 | Balci |
| 2014/0269930 A1 | 9/2014 | Robinson et al. |
| 2014/0289627 A1 | 9/2014 | Brockmann et al. |
| 2014/0317532 A1 | 10/2014 | Ma et al. |
| 2014/0344861 A1 | 11/2014 | Berner et al. |
| 2015/0023372 A1 | 1/2015 | Boatright |
| 2015/0037011 A1 | 2/2015 | Hubner et al. |
| 2015/0103880 A1* | 4/2015 | Diard .................. H04N 19/162 375/240.02 |
| 2015/0135209 A1 | 5/2015 | LaBosco et al. |
| 2015/0139603 A1 | 5/2015 | Silverstein et al. |
| 2015/0195525 A1 | 7/2015 | Sullivan et al. |
| 2016/0050069 A1 | 2/2016 | Griffin et al. |
| 2016/0119624 A1 | 4/2016 | Frishman |
| 2016/0142468 A1 | 5/2016 | Song et al. |
| 2016/0357583 A1 | 12/2016 | Decker et al. |
| 2017/0078721 A1 | 3/2017 | Brockmann et al. |

FOREIGN PATENT DOCUMENTS

| | | |
|---|---|---|
| AT | 250313 T | 10/2003 |
| AT | 472152 T | 7/2010 |
| AT | 475266 T | 8/2010 |
| AU | 620735 B2 | 2/1992 |
| AU | 643828 B2 | 11/1993 |
| AU | 2004253127 A1 | 1/2005 |
| AU | 2005278122 A1 | 3/2006 |
| CA | 682776 A | 3/1964 |
| CA | 2052477 | 3/1992 |
| CA | 1302554 | 6/1992 |
| CA | 2163500 | 5/1996 |
| CA | 2231391 A1 | 5/1997 |
| CA | 2273365 A1 | 6/1998 |
| CA | 2313133 A1 | 6/1999 |
| CA | 2313161 A1 | 6/1999 |
| CA | 2528499 A1 | 1/2005 |
| CA | 2569407 A1 | 3/2006 |
| CA | 2728797 A1 | 4/2010 |
| CA | 2787913 A1 | 7/2011 |
| CA | 2798541 A1 | 12/2011 |
| CA | 2814070 A1 | 4/2012 |
| CN | 1507751 A | 6/2004 |
| CN | 1969555 A | 5/2007 |
| CN | 101180109 A | 5/2008 |
| CN | 101627424 A | 1/2010 |
| CN | 101637023 A | 1/2010 |
| CN | 102007773 A | 4/2011 |
| CN | 103647980 A | 3/2014 |
| DE | 4408355 A1 | 10/1994 |
| DE | 69516139 | 12/2000 |
| DE | 69132518 | 9/2001 |
| DE | 69333207 | 7/2004 |
| DE | 98961961 T1 | 8/2007 |
| EP | 0128771 A2 | 12/1984 |
| EP | 0419137 A2 | 3/1991 |
| EP | 0449633 A1 | 10/1991 |
| EP | 0477786 A2 | 4/1992 |
| EP | 0523618 A2 | 1/1993 |
| EP | 0534139 A2 | 3/1993 |
| EP | 0568453 A1 | 11/1993 |
| EP | 0588653 A2 | 3/1994 |
| EP | 0594350 A1 | 4/1994 |
| EP | 0612916 A2 | 8/1994 |
| EP | 0624039 A2 | 11/1994 |
| EP | 0638219 A1 | 2/1995 |
| EP | 0643523 A1 | 3/1995 |
| EP | 0661888 A2 | 7/1995 |
| EP | 0714684 A1 | 6/1996 |
| EP | 0746158 A2 | 12/1996 |
| EP | 0761066 A1 | 3/1997 |
| EP | 0789972 A1 | 8/1997 |
| EP | 0830786 A1 | 3/1998 |
| EP | 0861560 A1 | 9/1998 |
| EP | 0 881 808 A2 | 12/1998 |
| EP | 0933966 | 8/1999 |
| EP | 0933966 A1 | 8/1999 |
| EP | 1026872 A1 | 8/2000 |
| EP | 1038397 A1 | 9/2000 |
| EP | 1038399 A1 | 9/2000 |
| EP | 1038400 A1 | 9/2000 |
| EP | 1038401 A1 | 9/2000 |
| EP | 1051039 A2 | 11/2000 |
| EP | 1055331 A1 | 11/2000 |
| EP | 1120968 A1 | 8/2001 |
| EP | 1345446 A1 | 9/2003 |
| EP | 1422929 A2 | 5/2004 |
| EP | 1428562 A2 | 6/2004 |
| EP | 1521476 A1 | 4/2005 |

(56) References Cited

FOREIGN PATENT DOCUMENTS

| | | |
|---|---|---|
| EP | 1645115 A1 | 4/2006 |
| EP | 1725044 A2 | 11/2006 |
| EP | 1767708 A2 | 3/2007 |
| EP | 1771003 A1 | 4/2007 |
| EP | 1772014 A1 | 4/2007 |
| EP | 1877150 A1 | 1/2008 |
| EP | 1887148 A2 | 2/2008 |
| EP | 1900200 A1 | 3/2008 |
| EP | 1902583 A1 | 3/2008 |
| EP | 1908293 A1 | 4/2008 |
| EP | 1911288 A2 | 4/2008 |
| EP | 1918802 A1 | 5/2008 |
| EP | 2100296 A1 | 9/2009 |
| EP | 2105019 A2 | 9/2009 |
| EP | 2106665 A2 | 10/2009 |
| EP | 2116051 A2 | 11/2009 |
| EP | 2124440 A1 | 11/2009 |
| EP | 2248341 A1 | 11/2010 |
| EP | 2269377 A2 | 1/2011 |
| EP | 2271098 A1 | 1/2011 |
| EP | 2304953 A2 | 4/2011 |
| EP | 2357555 A1 | 8/2011 |
| EP | 2364019 A2 | 9/2011 |
| EP | 2409493 A2 | 1/2012 |
| EP | 2477414 A2 | 7/2012 |
| EP | 2487919 A2 | 8/2012 |
| EP | 2520090 A2 | 11/2012 |
| EP | 2567545 A1 | 3/2013 |
| EP | 2577437 A1 | 4/2013 |
| EP | 2628306 A2 | 8/2013 |
| EP | 2632164 A2 | 8/2013 |
| EP | 2632165 A2 | 8/2013 |
| EP | 2695388 A2 | 2/2014 |
| ES | 2207635 T3 | 6/2004 |
| FR | 2529739 | 1/1984 |
| FR | 2891098 | 3/2007 |
| GB | 2207838 A | 2/1989 |
| GB | 2248955 A | 4/1992 |
| GB | 2290204 A | 12/1995 |
| GB | 2378345 | 2/2003 |
| GB | 2479164 A | 10/2011 |
| HK | 1134855 A1 | 10/2010 |
| HK | 1116323 A1 | 12/2010 |
| IE | 19913397 A1 | 4/1992 |
| IL | 99586 A | 2/1998 |
| IN | 180215 B | 1/1998 |
| IS | 3759 A7 | 3/1992 |
| JP | 60-054324 A | 3/1985 |
| JP | 63-033988 | 2/1988 |
| JP | 63-263985 A | 10/1988 |
| JP | 2001-241993 A | 9/1989 |
| JP | 7-160292 A | 6/1995 |
| JP | 8-265704 A | 10/1996 |
| JP | 10-228437 A | 8/1998 |
| JP | 11-134273 A | 5/1999 |
| JP | H11-261966 | 9/1999 |
| JP | 2001-145112 A | 5/2001 |
| JP | 2001-203995 A | 7/2001 |
| JP | 2001-245271 | 9/2001 |
| JP | 2001-245291 | 9/2001 |
| JP | 2002-057952 A | 2/2002 |
| JP | 2002-112220 A | 4/2002 |
| JP | 2002-141810 A | 5/2002 |
| JP | 2002-208027 | 7/2002 |
| JP | 2002-300556 A | 10/2002 |
| JP | 2002-319991 | 10/2002 |
| JP | 2003-506763 A | 2/2003 |
| JP | 2003-087673 | 3/2003 |
| JP | 2004-056777 A | 2/2004 |
| JP | 2004-110850 | 4/2004 |
| JP | 2004-112441 | 4/2004 |
| JP | 2004-135932 A | 5/2004 |
| JP | 2004-264812 A | 9/2004 |
| JP | 2004-312283 | 11/2004 |
| JP | 2004-533736 A | 11/2004 |
| JP | 2004-536381 A | 12/2004 |
| JP | 2004-536681 | 12/2004 |
| JP | 2005-033741 | 2/2005 |
| JP | 2005-084987 A | 3/2005 |
| JP | 2005-095599 | 3/2005 |
| JP | 8-095599 A | 4/2005 |
| JP | 2005-123981 A | 5/2005 |
| JP | 2005-156996 | 6/2005 |
| JP | 2005-519382 | 6/2005 |
| JP | 2005-523479 A | 8/2005 |
| JP | 2005-260289 | 9/2005 |
| JP | 2005-309752 | 11/2005 |
| JP | 2006-067280 | 3/2006 |
| JP | 2006-246358 A | 9/2006 |
| JP | 2007-129296 | 5/2007 |
| JP | 2007-522727 | 8/2007 |
| JP | 11-88419 | 9/2007 |
| JP | 2007-264440 A | 10/2007 |
| JP | 2008-535622 A | 9/2008 |
| JP | 2009-159188 A | 7/2009 |
| JP | 2009-543386 A | 12/2009 |
| JP | 2012-080593 A | 4/2012 |
| KR | 10-2005-0001362 | 1/2005 |
| KR | 10-2005-0085827 | 8/2005 |
| KR | 10-2006-0095821 | 9/2006 |
| KR | 20080001298 A | 1/2008 |
| NL | 1032594 C2 | 4/2008 |
| NL | 1033929 C1 | 4/2008 |
| NL | 2004780 A | 1/2012 |
| NZ | 239969 A | 12/1994 |
| PT | 99110 A | 12/1993 |
| WO | WO 1982002303 A1 | 7/1982 |
| WO | WO 1989008967 A1 | 9/1989 |
| WO | WO 90/13972 A1 | 11/1990 |
| WO | WO 93/22877 A2 | 11/1993 |
| WO | WO 1994016534 A2 | 7/1994 |
| WO | WO 1994019910 A1 | 9/1994 |
| WO | WO 1994021079 A1 | 9/1994 |
| WO | WO 95/15658 A1 | 6/1995 |
| WO | WO 1995032587 A1 | 11/1995 |
| WO | WO 1995033342 A1 | 12/1995 |
| WO | WO 1996014712 A1 | 5/1996 |
| WO | WO 1996027843 A1 | 9/1996 |
| WO | WO 1996031826 A1 | 10/1996 |
| WO | WO 1996037074 A2 | 11/1996 |
| WO | WO 1996042168 A1 | 12/1996 |
| WO | WO 1997016925 A1 | 5/1997 |
| WO | WO 1997033434 A1 | 9/1997 |
| WO | WO 1997039583 A1 | 10/1997 |
| WO | WO 1998026595 A1 | 6/1998 |
| WO | WO 99/04568 | 1/1999 |
| WO | WO 1999000735 A1 | 1/1999 |
| WO | WO 1999030496 A1 | 6/1999 |
| WO | WO 1999030497 A1 | 6/1999 |
| WO | WO 1999030500 A1 | 6/1999 |
| WO | WO 1999030501 A1 | 6/1999 |
| WO | WO 1999035840 A1 | 7/1999 |
| WO | WO 1999041911 A1 | 8/1999 |
| WO | WO 1999056468 A1 | 11/1999 |
| WO | WO 99/65232 A1 | 12/1999 |
| WO | WO 99/65243 A1 | 12/1999 |
| WO | WO 1999066732 A1 | 12/1999 |
| WO | WO 2000002303 A1 | 1/2000 |
| WO | WO 00/07372 A1 | 2/2000 |
| WO | WO 00/08967 A1 | 2/2000 |
| WO | WO 00/19910 A1 | 4/2000 |
| WO | WO 00/38430 A1 | 6/2000 |
| WO | WO 00/41397 A1 | 7/2000 |
| WO | WO 01/39494 A1 | 5/2001 |
| WO | WO 01/41447 A1 | 6/2001 |
| WO | WO01/56293 A1 | 8/2001 |
| WO | WO 01/82614 A1 | 11/2001 |
| WO | WO 02/089487 A2 | 7/2002 |
| WO | WO 02/076097 A1 | 9/2002 |
| WO | WO 02/076099 A1 | 9/2002 |
| WO | WO 03/026232 A1 | 3/2003 |
| WO | WO 03/026275 A2 | 3/2003 |
| WO | WO 03/047710 A2 | 6/2003 |
| WO | WO 03/065683 A1 | 8/2003 |

(56) References Cited

FOREIGN PATENT DOCUMENTS

| WO | WO 03/071727 A2 | 8/2003 |
|---|---|---|
| WO | WO 03/091832 A2 | 11/2003 |
| WO | WO 2004/012437 A2 | 2/2004 |
| WO | WO 2004/018060 A2 | 3/2004 |
| WO | WO2004/057609 A1 | 7/2004 |
| WO | WO 2004/073310 A1 | 8/2004 |
| WO | WO 2005/002215 A1 | 1/2005 |
| WO | WO 2005/053301 A2 | 6/2005 |
| WO | WO 2005/076575 | 8/2005 |
| WO | WO 2006/014362 A1 | 2/2006 |
| WO | WO 2006/022881 A1 | 3/2006 |
| WO | WO 2006/053305 | 5/2006 |
| WO | WO 2006/081634 A2 | 8/2006 |
| WO | WO 2006/105480 | 10/2006 |
| WO | WO 2006/110268 A1 | 10/2006 |
| WO | WO 2007/001797 A1 | 1/2007 |
| WO | WO 2007/008319 A1 | 1/2007 |
| WO | WO 2007/008355 A2 | 1/2007 |
| WO | WO 2007/008356 A1 | 1/2007 |
| WO | WO 2007/008357 A1 | 1/2007 |
| WO | WO 2007/008358 A1 | 1/2007 |
| WO | WO 2007/018722 A2 | 2/2007 |
| WO | WO 2007/018726 A2 | 2/2007 |
| WO | WO2008/044916 A1 | 4/2008 |
| WO | WO 2008/044916 A2 | 4/2008 |
| WO | WO 2008/086170 A1 | 7/2008 |
| WO | WO 2008/088741 A2 | 7/2008 |
| WO | WO 2008/088752 A2 | 7/2008 |
| WO | WO 2008/088772 A2 | 7/2008 |
| WO | WO 2008/100205 A1 | 8/2008 |
| WO | WO2009/038596 | 3/2009 |
| WO | WO 2009/038596 A1 | 3/2009 |
| WO | WO 2009/099893 A1 | 8/2009 |
| WO | WO 2009/099895 A1 | 8/2009 |
| WO | WO 2009/105465 A2 | 8/2009 |
| WO | WO 2009/110897 A1 | 9/2009 |
| WO | WO 2009/114247 A2 | 9/2009 |
| WO | WO 2009/155214 A2 | 12/2009 |
| WO | WO 2010/044926 A3 | 4/2010 |
| WO | WO 2010/054136 A2 | 5/2010 |
| WO | WO 2010/107954 A2 | 9/2010 |
| WO | WO 2011/014336 A1 | 9/2010 |
| WO | WO 2011/082364 A2 | 7/2011 |
| WO | WO 2011/139155 A1 | 11/2011 |
| WO | WO 2011/149357 A1 | 12/2011 |
| WO | WO 2012/051528 A2 | 4/2012 |
| WO | W O 2012/138660 A2 | 10/2012 |
| WO | WO 2012/138660 A2 | 10/2012 |
| WO | WO 2013/106390 A1 | 7/2013 |
| WO | WO 2013/155310 A1 | 7/2013 |
| WO | WO2013/184604 A1 | 12/2013 |

OTHER PUBLICATIONS

ActiveVideo Networks BV, International Preliminary Report on Patentability, PCT/NL2011/050308, dated Sep. 6, 2011, 8 pgs.
ActiveVideo Networks BV, International Search Report and Written Opinion, PCT/NL2011/050308, dated Sep. 6, 2011, 8 pgs.
Activevideo Networks Inc., International Preliminary Report on Patentability, PCT/US2011/056355, dated Apr. 16, 2013, 4 pgs.
ActiveVideo Networks Inc., International Preliminary Report on Patentability, PCT/US2012/032010, dated Oct. 8, 2013, 4 pgs.
ActiveVideo Networks Inc., International Search Report and Written Opinion, PCT/US2011/056355, dated Apr. 13, 2012, 6 pgs.
ActiveVideo Networks Inc., International Search Report and Written Opinion, PCT/US2012/032010, dated Oct. 10, 2012, 6 pgs.
ActiveVideo Networks Inc., International Search Report and Written Opinion, PCT/US2013/020769, dated May 9, 2013, 9 pgs.
ActiveVideo Networks Inc., International Search Report and Written Opinion, PCT/US2013/036182, dated Jul. 29, 2013, 12 pgs.
ActiveVideo Networks, Inc., International Search Report and Written Opinion, PCT/US2009/032457, dated Jul. 22, 2009, 7 pgs.
ActiveVideo Networks Inc., Extended EP Search Rpt, Application No. 09820936-4, dated Oct. 26, 2012, 11 pgs.
ActiveVideo Networks Inc., Extended EP Search Rpt, Application No. 10754084-1, dated Jul. 24, 2012, 11 pgs.
ActiveVideo Networks Inc., Extended EP Search Rpt, Application No. 10841764.3, dated May 20, 2014, 16 pgs.
ActiveVideo Networks Inc., Extended EP Search Rpt, Application No. 11833486.1, dated Apr. 3, 2014, 6 pgs.
Annex C—Video buffering verifier, information technology—generic coding of moving pictures and associated audio information: video, Feb. 2000, 6 pgs.
Antonoff, Michael, "Interactive Television," Popular Science, Nov. 1992, 12 pages.
Avinity Systems B.V., Extended European Search Report, Application No. 12163713.6, dated Feb. 7, 2014, 10 pgs.
Avinity Systems B.V., Extended European Search Report, Application No. 12163712-8, dated Feb. 3, 2014, 10 pgs.
Benjelloun, A summation algorithm for MPEG-1 coded audio signals: a first step towards audio processed domain, Annals of Telecommunications, Get Laudisier, Paris, vol. 55, No. 3/04, Mar. 1, 2000, 9 pgs.
Broadhead, Direct manipulation of MPEG compressed digital audio, Nov. 5-9, 1995, 41 pgs.
Cable Television Laboratories, Inc., "CableLabs Asset Distribution Interface Specification, Version 1.1", May 5, 2006, 33 pgs.
CD 11172-3, Coding of moving pictures and associated audio for digital storage media at up to about 1.5 MBIT, Jan. 1, 1992, 39 pgs.
Craig, Notice of Allowance, U.S. Appl. No. 11/178,176, dated Dec. 23, 2010, 8 pgs.
Craig, Notice of Allowance, U.S. Appl. No. 11/178,183, dated Jan. 12, 2012, 7 pgs.
Craig, Notice of Allowance, U.S. Appl. No. 11/178,183, dated Jul. 19, 2012, 8 pgs.
Craig, Notice of Allowance, U.S. Appl. No. 11/178,189, dated Oct. 12, 2011, 7 pgs.
Craig, Notice of Allowance, U.S. Appl. No. 11/178,176, dated Mar. 23, 2011, 8 pgs.
Craig, Notice of Allowance, U.S. Appl. No. 13/609,183, dated Aug. 26, 2013, 8 pgs.
Craig, Final Office Action, U.S. Appl. No. 11/103,838, dated Feb. 5, 2009, 30 pgs.
Craig, Final Office Action, U.S. Appl. No. 11/178,181, dated Aug. 25, 2010, 17 pgs.
Craig, Final Office Action, U.S. Appl. No. 11/103,838, dated Jul. 6, 2010, 35 pgs.
Craig, Final Office Action, U.S. Appl. No. 11/178,176, dated Oct. 1, 2010, 8 pgs.
Craig, Final Office Action, U.S. Appl. No. 11/178,183, dated Apr. 13, 2011, 16 pgs.
Craig, Final Office Action, U.S. Appl. No. 11/178,177, dated Oct. 26, 2010, 12 pgs.
Craig, Final Office Action, U.S. Appl. No. 11/178,181, dated Jun. 20, 2011, 21 pgs.
Craig, Office Action, U.S. Appl. No. 11/103,838, dated May 12, 2009, 32 pgs.
Craig, Office Action, U.S. Appl. No. 11/103,838, dated Aug. 19, 2008, 17 pgs.
Craig, Final Office Action, U.S. Appl. No. 11/103,838, dated Nov. 19, 2009, 34 pgs.
Craig, Office Action, U.S. Appl. No. 11/178,176, dated May 6, 2010, 7 pgs.
Craig, Office-Action U.S. Appl. No. 11/178,177, dated Mar. 29, 2011, 15 pgs.
Craig, Office Action, U.S. Appl. No. 11/178,177, dated Aug. 3, 2011, 26 pgs.
Craig, Office Action, U.S. Appl. No. 11/178,177, dated Mar. 29, 2010, 11 pgs.
Craig, Office Action, U.S. Appl. No. 11/178,181, dated Feb. 11, 2011, 19 pgs.
Craig, Office Action, U.S. Appl. No. 11/178,181, dated Mar. 29, 2010, 10 pgs.
Craig, Office Action, U.S. Appl. No. 11/178,182, dated Feb. 23, 2010, 15 pgs.

(56) References Cited

OTHER PUBLICATIONS

Craig, Office Action, U.S. Appl. No. 11/178,183, dated Dec. 6, 2010, 12 pgs.
Craig, Office Action, U.S. Appl. No. 11/178,183, dated Sep. 15, 2011, 12 pgs.
Craig, Office Action, U.S. Appl. No. 11/178,183, dated Feb. 19, 2010, 17 pgs.
Craig, Office Action, U.S. Appl. No. 11/178,183, dated Jul. 20, 2010, 13 pgs.
Craig, Office Action, U.S. Appl. No. 11/178,189, dated Nov. 9, 2010, 13 pgs.
Craig, Office Action, U.S. Appl. No. 11/178,189, dated Mar. 15, 2010, 11 pgs.
Craig, Office Action, U.S. Appl. No. 11/178,189, dated Jul. 23, 2009, 10 pgs.
Craig, Office Action, U.S. Appl. No. 11/178,189, dated May 26, 2011, 14 pgs.
Craig, Office Action, U.S. Appl. No. 13/609,183, dated May 9, 2013, 7 pgs.
Pavlovskaia, Office Action, JP 2011-516499, dated Feb. 14, 2014, 19 pgs.
Digital Audio Compression Standard(AC-3, E-AC-3), Advanced Television Systems Committee, Jun. 14, 2005, 236 pgs.
European Patent Office, Extended European Search Report for International Application No. PCT/US2010/027724, dated Jul. 24, 2012, 11 pages.
FFMPEG, http://www.ffmpeg.org downloaded Apr. 8, 2010, 8 pgs.
FFMEG-0.4.9 Audio Layer 2 Tables Including Fixed Psycho Acoustic Model, 2001, 2 pgs.
Herr, Notice of Allowance, U.S. Appl. No. 11/620,593, dated May 23, 2012, 5 pgs.
Herr, Notice of Allowance, U.S. Appl. No. 12/534,016, dated Feb. 7, 2012, 5 pgs.
Herr, Notice of Allowance, U.S. Appl. No. 12/534,016, dated Sep. 28, 2011, 15 pgs.
Herr, Final Office Action, U.S. Appl. No. 11/620,593, dated Sep. 15, 2011, 104 pgs.
Herr, Office Action, U.S. Appl. No. 11/620,593, dated Mar. 19, 2010, 58 pgs.
Herr, Office Action, U.S. Appl. No. 11/620,593, dated Apr. 21, 2009 27 pgs.
Herr, Office Action, U.S. Appl. No. 11/620,593, dated Dec. 23, 2009, 58 pgs.
Herr, Office Action, U.S. Appl. No. 11/620,593, dated Jan. 24, 2011, 96 pgs.
Herr, Office Action, U.S. Appl. No. 11/620,593, dated Aug. 27, 2010, 41 pgs.
Herre, Thoughts on an SAOC Architecture, Oct. 2006, 9 pgs.
Hoarty, The Smart Headend—A Novel Approach to Interactive Television, Montreux Int'l TV Symposium, Jun. 9, 1995, 21 pgs.
ICTV, Inc., International Preliminary Report on Patentability, PCT/US2006/022585, dated Jan. 29, 2008, 9 pgs.
ICTV, Inc., International Search Report / Written Opinion, PCT/US2006/022585, dated Oct. 12, 2007, 15 pgs.
ICTV, Inc., International Search Report / Written Opinion, PCT/US2008/000419, dated May 15, 2009, 20 pgs.
ICTV, Inc., International Search Report / Written Opinion; PCT/US2006/022533, dated Nov. 20, 2006; 8 pgs.
Isovic, Timing constraints of MPEG-2 decoding for high quality video: misconceptions and realistic assumptions, Jul. 2-4, 2003, 10 pgs.
MPEG-2 Video elementary stream supplemental information, Dec. 1999, 12 pgs.
Ozer, Video Compositing 101. available from http://www.emedialive.com, Jun. 2, 2004, 5pgs.
Porter, Compositing Digital Images, 18 Computer Graphics (No. 3), Jul. 1984, pp. 253-259.
RSS Advisory Board, "RSS 2.0 Specification", published Oct. 15, 2007.
SAOC use cases, draft requirements and architecture, Oct. 2006, 16 pgs.
Sigmon, Final Office Action, U.S. Appl. No. 11/258,602, dated Feb. 23, 2009, 15 pgs.
Sigmon, Office Action, U.S. Appl. No. 11/258,602, dated Sep. 2, 2008, 12 pgs.
TAG Networks, Inc., Communication pursuant to Article 94(3) EPC, European Patent Application, 06773714.8, dated May 6, 2009, 3 pgs.
TAG Networks Inc, Decision to Grant a Patent, JP 2009-544985, dated Jun 28, 2013, 1 pg.
TAG Networks Inc., IPRP, PCT/US2006/010080, dated Oct. 16, 2007, 6 pgs.
TAG Networks Inc., IPRP, PCT/US2006/024194, dated Jan. 10, 2008, 7 pgs.
TAG Networks Inc., IPRP, PCT/US2006/024195, dated Apr. 1, 2009, 11 pgs.
TAG Networks Inc., IPRP, PCT/US2006/024196, dated Jan. 10, 2008, 6 pgs.
TAG Networks Inc., International Search Report, PCT/US2008/050221, dated Jun. 12, 2008, 9 pgs.
TAG Networks Inc., Office Action, CN 200680017662.3, dated Apr. 26, 2010, 4 pgs.
TAG Networks Inc., Office Action, EP 06739032.8, dated Aug. 14, 2009, 4 pgs.
TAG Networks Inc., Office Action, EP 06773714.8, dated May 6, 2009, 3 pgs.
TAG Networks Inc., Office Action, EP 06773714.8, dated Jan. 12, 2010, 4 pgs.
TAG Networks Inc., Office Action, JP 2008-506474, dated Oct. 1, 2012, 5 pgs.
TAG Networks Inc., Office Action, JP 2008-506474, dated Aug. 8, 2011, 5 pgs.
TAG Networks Inc., Office Action, JP 2008-520254, dated Oct. 20, 2011, 2 pgs.
TAG Networks, IPRP, PCT/US2008/050221, dated Jul. 7, 2009, 6 pgs.
TAG Networks, International Search Report, PCT/US2010/041133, dated Oct. 19, 2010, 13 pgs.
TAG Networks, Office Action, CN 200880001325.4, dated Jun. 22, 2011, 4 pgs.
TAG Networks, Office Action, JP 2009-544985, dated Feb. 25, 2013, 3 pgs.
Talley, A general framework for continuous media transmission control, 21st IEEE Conference on Local Computer Networks, Oct. 13-16, 1996, 10 pgs.
The Toolame Project, Psych_nl.c, Oct. 1, 1999, 1 pg.
Todd, AC-3: flexible perceptual coding for audio transmission and storage, 96th Convention, Audio Engineering Society, Feb. 26-Mar. 1, 1994, 16 pgs.
Tudor, MPEG-2 Video Compression, Dec. 1995, 15 pgs.
TVHEAD, Inc., First Examination Report, IN 1744/MUMNP/2007, dated Dec. 30, 2013, 6 pgs.
TVHEAD, Inc., International Search Report, PCT/US2006/010080, dated Jun. 20, 2006, 3 pgs.
TVHEAD, Inc., International Search Report, PCT/US2006/024194, dated Dec. 15, 2006, 4 pgs.
TVHEAD, Inc., International Search Report, PCT/US2006/024195, dated Nov. 29, 2006, 9 pgs.
TVHEAD, Inc., International Search Report, PCT/US2006/024196, dated Dec. 11, 2006, 4 pgs.
TVHEAD, Inc., International Search Report, PCT/US2006/024197, dated Nov. 28, 2006, 9 pgs.
Vernon, Dolby digital: audio coding for digital television and storage applications, Aug. 1999, 18 pgs.
Wang, A beat-pattern based error concealment scheme for music delivery with burst packet loss, IEEE International Conference on Multimedia and Expo, ICME, Aug. 22, 2001, 4 pgs.
Wang, A compressed domain beat detector using MP3 audio bitstream, Sep. 30, 2001, 9 pgs.
Wang, A multichannel audio coding algorithm for inter-channel redundancy removal, May 12-15, 2001, 6 pgs.

(56) References Cited

OTHER PUBLICATIONS

Wang, An excitation level based psychoacoustic model for audio compression, Oct. 30, 1999, 4 pgs.
Wang, Energy compaction property of the MDCT in comparison with other transforms, AES 109th Convention, Los Angeles, Sep. 22-25, 2000, 23 pgs.
Wang, Exploiting excess masking for audio compression, 17th International Conference on High Quality Audio Coding, Sep. 2-5, 1999, 4 pgs.
Wang, schemes for re-compressing mp3 audio bitstreams, Audio Engineering Society, 111th Convention Sep. 21-24, 2001, New York, 5 pgs.
Wang, Selected advances in audio compression and compressed domain processing, Aug. 2001, 68 pgs.
Wang, The impact of the relationship between MDCT and DFT on audio compression, IEEE-PCM2000, Dec. 13-15, 2000, Sydney, Australia, 9 pgs.
ActiveVideo Networks, Inc., International Preliminary Report on Patentablity, PCT/US2013/036182, dated Oct. 14, 2014, 9 pgs.
ActiveVideo Networks Inc., Communication Pursuant to Rule 94(3), EP08713106-6, dated Jun. 26, 2014, 5 pgs.
ActiveVideo Networks Inc., Communication Pursuant to Rule 94(3), EP09713486.0, dated Apr. 14, 2014, 6 pgs.
ActiveVideo Networks Inc., Communication Pursuant to Rules 70(2) and 70a(2), EP11833486.1, dated Apr. 24, 2014, 1 pg.
ActiveVideo Networks Inc., Communication Pursuant to Rules 161(2) & 162 EPC, EP13775121.0, dated Jan. 20, 2015, 3 pgs.
ActiveVideo Networks Inc., Examination Report No. 1, AU2011258972, dated Jul. 21, 2014, 3 pgs.
ActiveVideo Networks, Inc., International Search Report and Written Opinion, PCT/US2014/041430, dated Oct. 9, 2014, 9 pgs.
Active Video Networks, Notice of Reasons for Rejection, JP2012-547318, dated Sep. 26, 2014, 7 pgs.
ActiveVideo Networks Inc., Certificate of Patent JP5675765, Jan. 9, 2015, 3 pgs.
ActiveVideo Networks Inc., Decision to refuse a European patent application (Art. 97(2) EPC, EP09820936.4, dated Feb. 20, 2015, 4 pgs.
ActiveVideo Networks Inc., Communication Pursuant to Article 94(3) EPC, EP10754084.1, dated Feb. 10, 2015, 12 pgs.
ActiveVideo Networks Inc., Communication under Rule 71(3) EPC, Intention to Grant, EP08713106.6, dated Feb. 19, 2015, 12 pgs.
ActiveVideo Networks Inc., Examination Report No. 2, AU2011249132, dated May 29, 2015, 4 pgs.
Activevideo Networks Inc., Examination Report No. 2, AU2011315950, dated Jun. 25, 2015, 3 pgs.
ActiveVideo, International Search Report and Written Opinion, PCT/US2015/027803, dated Jun. 24, 2015, 18 pgs.
ActiveVideo, International Search Report and Written Opinion, PCT/US2015/027804, dated Jun. 25, 2015, 10 pgs.
ActiveVideo Networks B.V., Office Action, IL222830, dated Jun. 28, 2015, 7 pgs.
ActiveVideo Networks, Inc., Office Action, JP2013534034, dated Jun. 16, 2015, 6 pgs.
ActiveVideo Networks Inc., Notice of Reasons for Rejection, JP2014-100460, dated Jan. 15, 2015, 6 pgs.
ActiveVideo Networks Inc., Notice of Reasons for Rejection, JP2013-509016, dated Dec. 24, 2014, 11 pgs.
ActiveVideo Networks, Inc., Certificate of Grant, EP08713106.6-1908, dated Aug. 5, 2015, 2 pgs.
ActiveVideo Networks, Inc., Certificate of Grant, AU2011258972, dated Nov. 19, 2015, 2 pgs.
ActiveVideo Networks, Inc., Certificate of Grant, AU2011315950, dated Dec. 17, 2015, 2 pgs.
ActiveVideo Networks, Inc., Certificate of Grant, AU2011249132, dated Jan. 7, 2016, 2 pgs.
ActiveVideo Networks, Inc., Certificate of Grant, HK10102800.4, dated Jun. 10, 2016, 3 pgs.
ActiveVideo Networks, Inc., Certificate of Grant, EP13168509.11908, dated Sep. 30, 2015, 2 pgs.
ActiveVideo Networks, Inc., Certificate of Patent, JP2013534034, dated Jan. 8, 2016, 4 pgs.
ActiveVideo Networks, Inc., Certificate of Patent, IL215133, dated Mar. 31, 2016, 1 pg.
ActiveVideo Networks, Inc., Communication Pursuant to Rules 161(1) and 162 EPC, EP14722897.7, dated Oct. 28, 2015, 2 pgs.
ActiveVideo Networks, Inc., Communication Pursuant to Article 94(3) EPC, EP14722897.7, dated Jun. 29, 2016, 6 pgs.
ActiveVideo Networks, Inc., Communication Pursuant to Article 94(3) EPC, EP11738835.5, dated Jun. 10, 2016, 3 pgs.
ActiveVideo Networks, Inc., Communication Pursuant to Rules 161(1) and 162 EPC, EP14740004.8, dated Jan. 26, 2016, 2 pgs.
ActiveVideo Networks, Inc., Communication Pursuant to Rules 161(1) and 162 EPC, EP14736535.7, dated Jan. 26, 2016, 2 pgs.
ActiveVideo Networks, Inc., Decision to Grant, EP08713106.6-1908, dated Jul. 9, 2015, 2 pgs.
ActiveVideo Networks, Inc., Decision to Grant, EP13168509.6-1908, dated Sep. 3, 2015, 2 pgs.
ActiveVideo Networks, Inc., Decision to Grant, JP2014100460, dated Jul. 24, 2015, 5 pgs.
ActiveVideo Networks, Inc., Decision to Refuse a European Patent Application, EP08705578.6, dated Nov. 26, 2015, 10 pgs.
ActiveVideo Networks, Inc., Extended European Search Report, EP13735906.3, dated Nov. 11, 2015, 10 pgs.
ActiveVideo Networks, Inc., Partial Supplementary Extended European Search Report, EP13775121.0, dated Jun. 14, 2016, 7 pgs.
ActiveVideo Networks, Inc., KIPO's Notice of Preliminary Rejection, KR10-2010-7019512, dated Jul. 15, 2015, 15 pgs.
ActiveVideo Networks, Inc., KIPO's 2nd-Notice of Preliminary Rejection, KR10-2010-7019512, dated Feb. 12, 2016, 5 pgs.
ActiveVideo Networks, Inc., KIPO's Notice of Preliminary Rejection, KR10-20107021116, dated Jul. 13, 2015, 19 pgs.
ActiveVideo Networks, Inc., KIPO's Notice of Preliminary Rejection, KR10-2011-7024417, dated Feb. 18, 2016, 16 pgs.
ActiveVideo Networks, Inc., International Search Report and Written Opinion, PCT-US2015028072, dated Aug. 7, 2015, 9 pgs.
ActiveVideo Networks, Inc., International Preliminary Report on Patentability, PCT-US2014030773, dated Sep. 15, 2015, 6 pgs.
ActiveVideo Networks, Inc., International Preliminary Report on Patentability, PCT/US2014041430, dated Dec. 8, 2015, 6 pgs.
ActiveVideo Networks, Inc., International Preliminary Report on Patentability, PCT-US2014041416, dated Dec. 8, 2015, 6 pgs.
ActiveVideo Networks, Inc., International Search Report and Written Opinion, PCT/US2015/000502, dated May 6, 2016, 8 pgs.
ActiveVideo, Communication Pursuant to Article-94(3) EPC, EP12767642.7, dated Sep. 4, 2015, 4 pgs.
ActiveVideo, Communication Pursuant to Article 94(3) EPC, EP10841764.3, dated Dec. 18, 2015, 6 pgs. Dec. 18, 2015.
ActiveVideo Networks, Inc., Communication Pursuant to Rules 70(2) abd 70a(2) EP13735906.3, dated Nov. 27, 2015, 1 pg.
ActiveVideo, Notice of Reasons for Rejection, JP2013-509016, dated Dec. 3, 2015, 7 pgs.
ActiveVideo, Notice of German Patent, EP602008040474-9, dated Jan. 6, 2016, 4 pgs.
Avinity Systems B. V., Final Office Action, JP-2009-530298, dated Oct. 7, 2014, 8 pgs.
Avinity Systems B.V., PreTrial-Reexam-Report, JP2009530298, dated Apr. 24, 2015, 6 pgs.
Avinity Systems B.V., Notice of Grant—JP2009530298, dated Apr. 12, 2016, 3 pgs.
Brockmann, Notice of Allowance, U.S. Appl. No. 13/445,104, dated Dec. 24, 2014, 14 pgs.
Brockmann, Final Office Action, U.S. Appl. No. 13/686,548, dated Sep. 24, 2014, 13 pgs.
Brockmann, Final Office Action, U.S. Appl. No. 13/438,617, dated Oct. 3, 2014, 19 pgs.
Brockmann, Office Action, U.S. Appl. No. 12/443,571, dated Nov. 5, 2014, 26 pgs.
Brockmann, Office Action, U.S. Appl. No. 13/668,004, dated Feb. 26, 2015, 17 pgs.
Brockmann, Office Action, U.S. Appl. No. 13/686,548, dated Jan. 5, 2015, 12 pgs.

(56) References Cited

OTHER PUBLICATIONS

Brockmann, Office Action, U.S. Appl. No. 13/911,948, dated Dec. 26, 2014, 12 pgs.
Brockmann, Office Action, U.S. Appl. No. 13/911,948, dated Jan. 29, 2015, 11 pgs.
Brockmann, Office Action, U.S. Appl. No. 13/737,097, dated Mar. 16, 2015, 18 pgs.
Brockmann, Notice of Allowance, U.S. Appl. No. 13/911,948, dated Jul. 10, 2015, 5 pgs.
Brockmann, Notice of Allowance, U.S. Appl. No. 14/298,796, dated Mar. 18, 2015, 11 pgs.
Brockmann, Notice of Allowance, U.S. Appl. No. 13/438,617, dated May 22, 2015, 18 pgs.
Brockmann, Notice of Allowance, U.S. Appl. No. 13/445,104, dated Apr. 23, 2015, 8 pgs.
Brockmann, Final Office Action, U.S. Appl. No. 12/443,571, dated Jul. 9, 2015, 28 pgs.
Brockmann, Office Action, U.S. Appl. No. 14/262,674, dated May 21, 2015, 7 pgs.
Brockmann, Notice of Allowance, U.S. Appl. No. 14/262,674, dated Sep. 30, 2015, 7 pgs.
Brockmann, Notice of Allowance, U.S. Appl. No. 13/911,948, dated Aug. 21, 2015, 6 pgs.
Brockmann, Notice of Allowance, U.S. Appl. No. 13/911,948, dated Aug. 5, 2015, 5 pgs.
Brockmann, Final Office Action, U.S. Appl. No. 13/668,004, dated Aug. 3, 2015, 18 pgs.
Brockmann, Office Action, U.S. Appl. No. 13/668,004, dated Mar. 25, 2016, 17 pgs.
Brockmann, Final Office Action, U.S. Appl. No. 13/686,548, dated Aug. 12, 2015, 13 pgs.
Brockmann, Office Action, U.S. Appl. No. 13/686,548, dated Feb. 8, 2016, 13 pgs.
Brockmann, Final Office Action, U.S. Appl. No. 13/737,097, dated Aug. 14, 2015, 17 pgs.
Brockmann, Office Action, U.S. Appl. No. 14/298,796, dated Sep. 11, 2015, 11 pgs.
Brockmann, Notice of Allowance, U.S. Appl. No. 14/298,796, dated Mar. 17, 2016, 9 pgs.
Brockmann, Final Office Action, U.S. Appl. No. 12/443,571, dated Aug. 1, 2016, 32 pgs.
Brockmann, Office Action, U.S. Appl. No. 12/443,571, dated Dec. 4, 2015, 30 pgs.
Craig, Decision on Appeal—Reversed—, U.S. Appl. No. 11/178,177, dated Feb. 25, 2015, 7 pgs.
Craig, Notice of Allowance, U.S. Appl. No. 11/178,177, dated Mar. 5, 2015, 7 pgs.
Craig, Notice of Allowance, U.S. Appl. No. 11/178,181, dated Feb. 13, 2015, 8 pgs.
Dahlby, Office Action, U.S. Appl. No. 12/651,203, dated Dec. 3, 2014, 19 pgs.
Dahlby, Office Action U.S. Appl. No. 12/651,203, dated Jul. 2, 2015, 25 pgs.
Dahlby, Final Office Action, U.S. Appl. No. 12/651,203, dated Dec. 11, 2015, 25 pgs.
ETSI, "Hybrid Broadcast Broadband TV," ETSI Technical Specification 102 796 V1.1.1, Jun. 2010, 75 pgs.
Gecsei, J., "Adaptation in Distributed Multimedia Systems," IEEE Multimedia, IEEE Service Center, New York, NY, vol. 4, No. 2, Apr. 1, 1997, 10 pgs.
Gordon, Notice of Allowance, U.S. Appl. No. 12/008,697, dated Dec. 8, 2014, 10 pgs.
Gordon, Office Action, U.S. Appl. No. 12/008,722, dated Nov. 28, 2014, 18 pgs.
Gordon, Notice of Allowance, U.S. Appl. No. 12/008,697, datd Apr. 1, 2015, 10 pgs.
Gordon, Final Office Action, U.S. Appl. No. 12/008,722, dated Jul. 2, 2015, 20 pgs.
Gordon, Notice of Allowance, UU.S. Appl. No. 12/008,722, dated Feb. 17, 2016, 10 pgs.

Jacob, Bruce, "Memory Systems: Cache, DRAM, Disk," Oct. 19, 2007, The Cache Layer, Chapter 22, p. 739.
Ohta, K., et al., "Selective Multimedia Access Protocol for Wireless Multimedia Communication," Communications, Computers and Signal Processing, 1997, IEEE Pacific Rim Conference NCE Victoria, BC, Canada, Aug. 1997, vol. 1, 4 pgs.
OIPF, "Declarative Application Environment," Open IPTV Forum, Release 1 Specification, vol. 5, V.1.1, Oct. 8, 2009, 281 pgs.
Regis, Notice of Allowance, U.S. Appl. No. 13/273,803, dated Nov. 18, 2014, 9 pgs.
Regis, Notice of Allowance, U.S. Appl. No. 13/273,803, dated Mar. 2, 2015, 8 pgs.
Schierl, T., et al., 3GPP Compliant Adaptive Wireless Video Streaming Using H.264/AVC, © 2005, IEEE, 4 pgs.
Sigmon, Notice of Allowance, U.S. Appl. No. 13/311,203, dated Dec. 19, 2014, 5 pgs.
Sigmon, Notice of Allowance, U.S. Appl. No. 13/311,203, dated Apr. 14, 2015, 5 pgs.
TAG Networks Inc, Decision to Grant a Patent, JP 2008-506474, dated Oct. 4, 2013, 5 pgs.
Wei, S., "QoS Tradeoffs Using an Application-Oriented Transport Protocol (AOTP) for Multimedia Applications Over IP." Sep. 23-26 1999, Proceedings of the Third International Conference on Computational Intelligence and Multimedia Applications, New Delhi, India, 5 pgs.
ActiveVideo Networks, Inc., Certificate of Grant, HK14101604, dated Sep. 8, 2016, 4 pgs.
ActiveVideo Networks, Inc., Communication Pursuant to Rules 161(1) and 162 EPC, EP15785776.4, dated Dec. 8, 2016, 2 pgs.
ActiveVideo Networks, Inc., Communication Pursuant to Rules 161(1) and 162 EPC, EP15721482.6, dated Dec. 13, 2016, 2 pgs.
ActiveVideo Networks, Inc., Communication Pursuant to Rules 161(1) and 162 EPC, EP15721483.4, dated Dec. 15, 2016, 2 pgs.
ActiveVideo Networks, Inc., Communication Under Rule 71(3), Intention to Grant, EP11833486.1, dated Apr. 21, 2017, 7 pgs.
ActiveVideo Networks, Inc., Decision to Refuse an EP Patent Application, EP 10754084.1, dated Nov. 3, 2016, 4 pgs.
ActiveVideo Networks, Inc. Notice of Reasons for Rejection, JP2015-159309, dated Aug. 29, 2016, 11 pgs.
ActiveVideo Networks, Inc. Denial of Entry of Amendment, JP2013-509016, dated Aug. 30, 2016, 7 pgs.
ActiveVideo Networks, Inc. Notice of Final Rejection, JP2013-509016, dated Aug. 30, 2016, 3 pgs.
ActiveVideo Networks, Inc., KIPO's Notice of Preliminary Rejection, KR10-2012-7031648, dated Mar. 27, 2017, 3 pgs.
ActiveVideo Networks, Inc., International Preliminary Report on Patentability, PCT-US2015028072, dated Nov. 1, 2016, 7 pgs.
ActiveVideo Networks, Inc., International Preliminary Report on Patentability, PCT-US2015/027803, dated Oct. 25, 2016, 8 pgs.
ActiveVideo Networks, Inc., International Preliminary Report on Patentability, PCT-US2015/027804, dated Oct. 25, 2016, 6 pgs.
ActiveVideo Networks, Inc., International Search Report and Written Opinion, PCT/US2016/040547, dated Sep. 19, 2016, 6 pgs.
ActiveVideo Networks, Inc., International Search Report and Written Opinion, PCT/US2016/051283, dated Nov. 29, 2016, 10 pgs.
ActiveVideo Networks, Inc., Communication Pursuant to Article 94(3), EP13735906.3, dated Jul. 18, 2016, 5 pgs.
ActiveVideo, Intent to Grant, EP12767642.7, dated Jan. 2, 2017, 15 pgs.
Avinity Systems B.V., Decision to Refuse an EP Patent Application, EP07834561.8, dated Oct. 10, 2016, 17 pgs.
Brockmann, Final Office Action, U.S. Appl. No. 13/668,004, dated Nov. 2, 2016, 20 pgs.
Brockmann, Office Action, U.S. Appl. No. 13/668,004, dated Mar. 31, 2017, 21 pgs.
Brockmann, Office Action, U.S. Appl. No. 13/737,097, dated May 16, 2016, 23 pgs.
Brockmann, Final Office Action, U.S. Appl. No. 13/737,097, dated Oct. 20, 2016, 22 pgs.
Brockmann, Office Action, U.S. Appl. No. 14/217,108, dated Apr. 13, 2016, 8 pgs.
Brockmann, Office Action, U.S. Appl. No. 14/696,462, dated Feb. 8, 2017, 6 pgs.

(56) References Cited

OTHER PUBLICATIONS

Brockmann, Office Action, U.S. Appl. No. 15/139,166, dated Feb. 28, 2017, 10 pgs.
Brockmann, Final Office Action, U.S. Appl. No. 14/217,108, dated Dec. 1, 2016, 9 pgs.
Brockmann, Notice of Allowance, U.S. Appl. No. 14/696,463, dated Aug. 14, 2017, 14 pgs.
Dahlby, Advisory Action, U.S. Appl. No. 12/651,203, dated Nov. 21, 2016, 5 pgs.
Hoeben, Office Action, U.S. Appl. No. 14/757,935, dated Sep. 23, 2016, 28 pgs.
Hoeben, Final Office Action, U.S. Appl. No. 14/757,935, dated Apr. 12, 2017, 29 pgs.
McElhatten, Office Action, U.S. Appl. No. 14/698,633, dated Feb. 22, 2016, 14 pgs.
McElhatten, Final Office Action, U.S. Appl. No. 14/698,633, dated Aug. 18, 2016, 16 pgs.
McElhatten, Office Action, U.S. Appl. No. 14/698,633, dated Feb. 10, 2017, 15 pgs.
ActiveVideo Networks, Inc., Decision to grant an European Patent, EP12767642.7, dated May 11, 2017, 2 pgs.
ActiveVideo Networks, Inc., Decision to Grant an European Patent, EP06772771.9, dated Oct. 26, 2017, 2 pgs.
ActiveVideo Networks, Inc., Certficate of Grant, EP06772771.9, dated Nov. 22, 2017, 1 pg.
ActiveVideo Networks, Inc., Decision to grant an European Patent, EP11833486.1, dated Oct. 26, 2017, 2 pgs.
ActiveVideo Networks, Inc., Certificate of Grant, EP11833486.1, dated Nov. 22, 2017, 1 pg.
ActiveVideo Networks, Inc., Transmission of Certificate of Grant, EP12767642-7, dated Jun. 7, 2017, 1 pg.
ActiveVideo Networks, Inc., Certificate of Grant, EP12767642-7, dated Jun. 7, 2017, 1 pg.
ActiveVideo Networks, Inc., Intention to Grant, EP06772771.9, dated Jun. 12, 2017, 5 pgs.
ActiveVideo Networks, Inc., Communication Pursuant to Article 94(3), EP14722897.7, dated Jul. 19, 2017, 7 pgs.
ActiveVideo Networks, Inc., Communication Pursuant to Article 94(3), EP14740004.8, dated Aug. 24, 2017, 7 pgs.
ActiveVideo Networks, Inc., Communication Pursuant to Article 94(3), EP15721482.6, dated Nov. 20, 2017, 7 pgs.
ActiveVideo Networks, Inc., Communication Pursuant to Article 94(3), EP15721483.4, dated Dec. 10, 2018, 5 pgs.
ActiveVideo Networks, Inc., Communication Pursuant to Rules 161(2) and 162,EP16818840.7, dated Feb. 20, 2018, 3 pgs.
ActiveVideo Networks, Inc., Extended European Search Report, EP15785776.4, dated Aug. 18, 2017, 8 pgs.
ActiveVideo Networks, Inc., Extended European Search Report, EP15873840.1, dated May 18, 2018, 9 pgs.
ActiveVideo Networks, Inc., Communication Pursuant to Rules 70(2) and 70a(2), EP15873840.1, dated Jun. 6, 2018, 1 pg.
ActiveVideo Networks, Inc., Communication Pursuant to Rules 70(2) and 70a(2), EP16845261.3, dated Jan. 18, 2019, 1 pg.
ActiveVideo Networks, Inc., Notification of German Patent, DE602012033235.2, dated Jun. 13, 2017, 3 pgs.
ActiveVideo Networks, Inc., International Preliminary Report on Patentability, PCT/US2016/040547, dated Jan. 2, 2018, 5 pgs.
ActiveVideo Networks, Inc., Extended European Search Report, EP16818840.7, dated Nov. 30, 2018, 5 pgs.
ActiveVideo Networks, Inc., International Search Report and Written Opinion, PCT/US2016/064972, dated Feb. 17, 2017, 9 pgs.
ActiveVideo Networks, Inc., International Preliminary Report on Patentability, PCT/US2016/064972, dated Jun. 14, 2018, 7 pgs.
ActiveVideo Networks, Inc., International Search Report and Written Opinion, PCT/US2017/068293, dated Mar. 19, 2018, 7 pgs.
Brockmann, Office Action, U.S. Appl. No. 12/443,571, dated May 31, 2017, 36 pgs.
Brockmann, Notice of Allowance, U.S. Appl. No. 14/696,462, dated Jul. 21, 2017, 6 pgs.
Brockmann, Office Action, U.S. Appl. No. 15/728,430, dated Jul. 27, 2018, 6 pgs.
Brockmann, Office Action, U.S. Appl. No.14/217,108, dated Aug. 10, 2017, 14 pgs.
Brockmann, Office Action, U.S. Appl. No. 15/139,166, dated Nov. 22, 2017, 9 pgs.
Brockmann, Notice of Allowance, U.S. Appl. No. 15/139,166, dated Oct. 1, 2018, 7 pgs.
Brockmann, Office Action, U.S. Appl. No. 15/791,198, dated Dec. 21, 2018, 18 pgs.
Brockmann, Office Action, U.S. Appl. No. 15/199,503, dated Feb. 7, 2018, 12 pgs.
Brockmann, Notice of Allowance, U.S. Appl. No. 15/199,503, dated Aug. 16, 2018, 13 pgs.
Brockmann, Notice of Allowance, U.S. Appl. No. 15/199,503, dated Dec. 12, 2018, 9 pgs.
Brockmann, Office Action, U.S. Appl. No. 15/261,791, dated Feb. 21, 2018, 26 pgs.
Brockmann, Final Office Action, U.S. Appl. No. 15/261,791, dated Oct. 16, 2018, 17 pgs.
Hoeben, Final Office Action, U.S. Appl. No. 14/757,935, dated Feb. 28, 2018, 33 pgs.
Hoeben, Office Action, U.S. Appl. No. 14/757,935, dated Jun. 28, 2018, 37 pgs.
Hoeben, Office Action, U.S. Appl. No. 15/851,589, dated Sep. 21, 2018, 19 pgs.
Hoeben, Notice of Allowance, U.S. Appl. No. 14/757,935, dated Jan. 28, 2019, 9 pgs.
Visscher, Office Action, U.S. Appl. No. 15/368,527, dated Feb. 23, 2018, 23 pgs.
Visscher, Final Office Action, U.S. Appl. No. 15/368,527, dated Sep. 11, 2018, 25 pgs.
Visscher, Office Action, U.S. Appl. No. 15/368,527, dated Feb. 1, 2019, 29 pgs.

* cited by examiner

Reduced frame rate.

Maintain video frame rate at the expense of user interface latency.

CLASS-BASED INTELLIGENT MULTIPLEXING OVER UNMANAGED NETWORKS

RELATED APPLICATIONS

This application is a continuation of U.S. Non-Provisional Patent Application Ser. No. 14/696,463, filed Apr. 26, 2015 entitled "Class-Based Intelligent Multiplexing Over Unmanaged Networks," which claims priority to U.S. Provisional Patent Application No. 61/984,703, entitled "Class-Based Intelligent Multiplexing over Unmanaged Networks," filed Apr. 25, 2014, and which is a continuation-in-part of U.S. patent application Ser. No. 13/438,617, entitled "Reduction of Latency in Video Distribution Networks using Adaptive Bit Rates," filed Apr. 3, 2012, all of which are incorporated by reference herein in their entirety.

TECHNICAL FIELD

The present disclosure pertains generally to cable television network technology, and particularly to adaptive and dynamic multiplexing techniques for interactive television services delivered over various network topologies including the Internet.

BACKGROUND

Interactive television services provide a television viewer with the ability to interact with their television in meaningful ways. Such services have been used, for example, to provide navigable menuing and ordering systems that are used to implement electronic program guides and pay-per-view or other on-demand program reservations and purchases, eliminating the need to phone the television provider. Other uses include interacting with television programming for more information on characters, plot, or actors, or interacting with television advertisements for more information on a product or for a discount coupon.

These services typically employ a software application that is executed on a server system located remotely from the TV viewer such as at a cable television headend. The output of the application is streamed to the viewer, typically in the form of an audio-visual MPEG Transport Stream. This enables the stream to be displayed on virtually any client device that has MPEG decoding capabilities such as a television set-top box. The client device allows the user to interact with the remote application by capturing keystrokes and passing these back to the application running on the server.

In cable system deployments, the headend server and its in-home set-top or other client are separated by a managed digital cable-TV network that uses well-known protocols such as ATSC or DVB-C. Here, "managed" means that any bandwidth resources required to provide these services may be reserved prior to use. Once resources are allocated, the bandwidth is guaranteed to be available, and the viewer is assured of receiving a high-quality interactive application experience.

In recent years, audio-visual consumer electronics devices increasingly support a Local Area Network (LAN) connection, giving rise to a new class of client devices: so-called "Broadband Connected Devices", or BCDs. These devices may be used in systems other than the traditional cable television space, such as on the Internet. For example, a client device, such as a so-called smart TV, may implement a client application to deliver audio-visual applications streamed over a public data network from an audio-visual application streaming server to a television. A user may employ a remote control in conjunction with the client device to transmit interactive commands back to the application streaming server, thereby interacting with the server controlling the choice and delivery of desired content.

The "last mile" (the final leg of the telecommunications networks providing the actual connectivity to the end user) in public networks is typically made up of a number of network technologies, ranging from high-capacity fiber-optical networks to asymmetric digital subscriber lines. In contrast inside a home, distribution is often realized by means of wireless technologies such as IEEE 802.11 networks (commonly known as Wi-Fi networks.) As a result, capacity (here meaning the maximum aggregate bandwidth a specific link is able to carry) varies between end-users, and due to the wireless technologies involved, capacity for a particular end-user also varies over time. Further, public data networks are not managed in the same way as private cable television distribution systems are. TCP, the most common transport protocol for the Internet, tries to maximize usage of its fair share of the capacity. As a result, it is impossible to guarantee a specific amount of bandwidth to applications running over such networks.

The intricacies of transmitting video over a network of varying capacity and available bandwidth (i.e., capacity not in use yet) conditions are a known challenge that has been successfully addressed. Examples of systems that transmit video over a network with varying capacity and available bandwidth (i.e., capacity not in use yet) include:

1. Video conference call systems,
2. Cloud game services,
3. HLS (HTTP Live Streaming), and
4. Progressive download video-on-demand.

Video conference call systems and cloud game services represent a type of system where a continuous low-delay video signal is encoded in real-time. The encoded stream adapts to changing network conditions by changing the picture quality, where a lower picture quality (typically realized by a higher average quantization of the coefficients that represent the picture) yields a lower average bitrate. Typically, these systems stream over an unreliable transport (such as UDP or RTP) and employ error correction and/or concealment mechanisms to compensate for loss. Any artifacts due to this loss or imperfect concealment are corrected over time due to the continuous nature of the signal. These systems require a complex and often proprietary client not only because of the complexity of the employed methods of concealment, but also because the client plays an important role in the measurement and reporting of the statistics that allow the server to make intelligent decisions about network conditions.

On the other end of the spectrum are systems that stream an offline-encoded, non-real-time stream over a reliable transport protocol like TCP/HTTP. These streams are progressively downloaded, where buffering makes the system robust for temporal variations in available bandwidth or capacity and, in the case of HLS for example, the stream changes to a different quality level depending on the capacity or sustained available bandwidth. In this case, the complexity of the client is relatively low and the components that make up the client are well-defined.

An interactive television service has a combination of properties of both of these previously mentioned types of systems. The streams exhibit low delay, real-time properties typically associated with UDP/RTP high-complexity, proprietary clients. However, the stream is received by relatively low-complexity clients using standard components. Typically such clients are more akin to progressive download clients using TCP/HTTP than to the clients that provide interactive or real-time services.

An interactive television service also has relatively static portions with a graphical user interface (GUI) that requires low-latency, artifact-free updates upon interactivity, combined with portions that have full motion video and audio that require smooth and uninterrupted play out.

Conventional systems do not adequately facilitate this combination of requirements. A new approach is therefore needed.

SUMMARY

Digital television over a managed network such as a cable television system uses constant-bandwidth channels to carry multiple program streams. Multiplexing within a fixed allocation of bandwidth requires a multiplexer controller to manage the allocation of bandwidth among a group of competing program streams or competing sessions. In this manner, an individual program stream or session competes for bandwidth against the remainder of the program streams or sessions in the group of program streams or sessions. Control logic in the multiplexer controller manages the byte allocation among the program streams so that as few compromises as possible in quality are required and the compromises are evenly distributed among the group.

Managed networks form the vast majority of commercial television program distribution networks. However, video program consumption is rapidly moving to both live and on-demand consumption via the Internet, an unmanaged network. Today fully one-third of all Internet data traffic at primetime is from the popular Internet video service Netflix. In the near future, over 80% of all Internet traffic will be video data.

On an unmanaged network, such as the Internet, a single program stream (or session) competes for bandwidth from a large number of other unknown streams over which the multiplexer has no control. One of the many advantages of the systems and methods described herein is a multiplexer controller that can control sending video information over unmanaged networks and utilize a class-based, multi-dimensional control logic that optimizes the interactive user experience for interactive and on-demand television programming.

Interactive television services provide the viewer with the ability to interact with their television for the purposes of selecting certain television programming, requesting more information about the programming, or responding to offers, among many possible uses. Such services have been used, for example, to provide navigable menu and ordering systems that are used to implement electronic program guides and on-demand and pay-per-view program reservations. These services typically employ an application that is executed on a server located remotely from the viewer. Such servers may be, for example, located at a cable television headend. The output of a software application running on the server is streamed to the viewer, typically in the form of an audio-visual MPEG Transport Stream. This enables the stream to be displayed on virtually any client device that has MPEG decoding capabilities, including a "smart" television, television set-top box, game console, and various network-connected consumer electronics devices and mobile devices. The client device enables the user to interact with the remote application by capturing keystrokes and passing the keystrokes to the software application over a network connection.

An interactive television service combines the properties of both of the aforementioned types of systems (i.e., managed and unmanaged network topologies). Such services require low delay, perceptually real-time properties typically associated with Real Time Transport Protocol running over User Datagram Protocol (UDP/RTP) on high-complexity, proprietary clients. However, in interactive television applications the stream is received by relatively low-complexity clients using consumer-electronics-grade components. Typically, the clients are more akin to progressive download clients using Transmission Control Protocol/Hypertext Transfer Protocol (TCP/HTTP) than to the clients that typically provide interactive services.

An interactive television service is also a combination of relatively static image portions representing a graphical user interface (graphical UI or GUI) that requires low-latency, artifact-free updates responsive to user input, and other portions that may have video with associated audio that require smooth and uninterrupted play-out. Conventional multiplexers do not adequately facilitate this combination of data types over the Internet. For instance, with existing system that send data over the Internet, when large user interface graphics of a particular session need to be sent to a particular client, if unpredictable network congestions impacts delivery, such systems have no means available (except a drastic reduction in image quality) to scale back or modify the order of multiplex elements to allow a temporary large data block representing the UI graphics to pass, for just one example.

With an extraordinarily high number of sessions active across the Internet, the probability for disruption to video, audio and/or GUI data is certain. The only alternative that conventional systems have is for often drastic reductions in video quality or greatly lowering of frame rate or, worse, the interruption of program material while the receiving client device attempts to buffer sufficient data to proceed.

The present embodiments overcome these common obstacles to sending video programming and interactive television services over unmanaged networks to receiving client devices by exploiting class-based asset allocation. For example, improvement in video transmission across an unmanaged network is realized using multi-dimensional control loop-logic that is programmed to make the best choice in managing adverse network conditions by trading off latency with frame rate with video quality. Critical data such as audio is maximally protected against packet loss, which is desirable because "the ears don't blink": audio interruptions are usually very objectionable compared to the same in video.

Furthermore, network latency is measured such that useful measures of network congestion can be estimated.

In some embodiments, a method of adapting content-stream bandwidth includes generating a content stream for transmission over an unmanaged network with varying capacity; sending the content stream, via the unmanaged network, toward a client device; monitoring the capacity of the unmanaged network; determining whether an aggregate bandwidth of an upcoming portion of the content stream fits the capacity, wherein the upcoming portion of the content stream corresponds to a respective frame time and includes video content and user-interface data; and, in response to a determination that the aggregate bandwidth does not fit the capacity, reducing a size of the upcoming portion of the content stream.

In some embodiments, a server system includes one or more processors and memory storing one or more programs configured to be executed by the one or more processors. The one or more programs include instructions for performing the above-described method. In some embodiments, a non-transitory computer-readable storage medium stores one or more programs configured for execution by one or more processors of a server system. The one or more programs include instructions for performing the above-described method.

BRIEF DESCRIPTION OF THE DRAWINGS

For a better understanding of the various described embodiments, reference should be made to the Detailed Description below, in conjunction with the following drawings. Like reference numerals refer to corresponding parts throughout the figures and description.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

In recent years, audio-visual consumer electronics devices increasingly support a Local Area Network (LAN) connection, giving rise to a new class of client devices: so-called "Broadband Connected Devices", or BCDs. These devices may be used in systems other than traditional cable television, such as on the Internet. For example, a client device such as a smart TV may implement a client application to deliver audio-visual applications streamed over a public data network from an audio-visual application streaming server (also referred to as an application server) to a television. A user may employ a remote control in conjunction with the client device to transmit interactive commands back to the application streaming server, thereby controlling the content interactively.

Figure 1A:
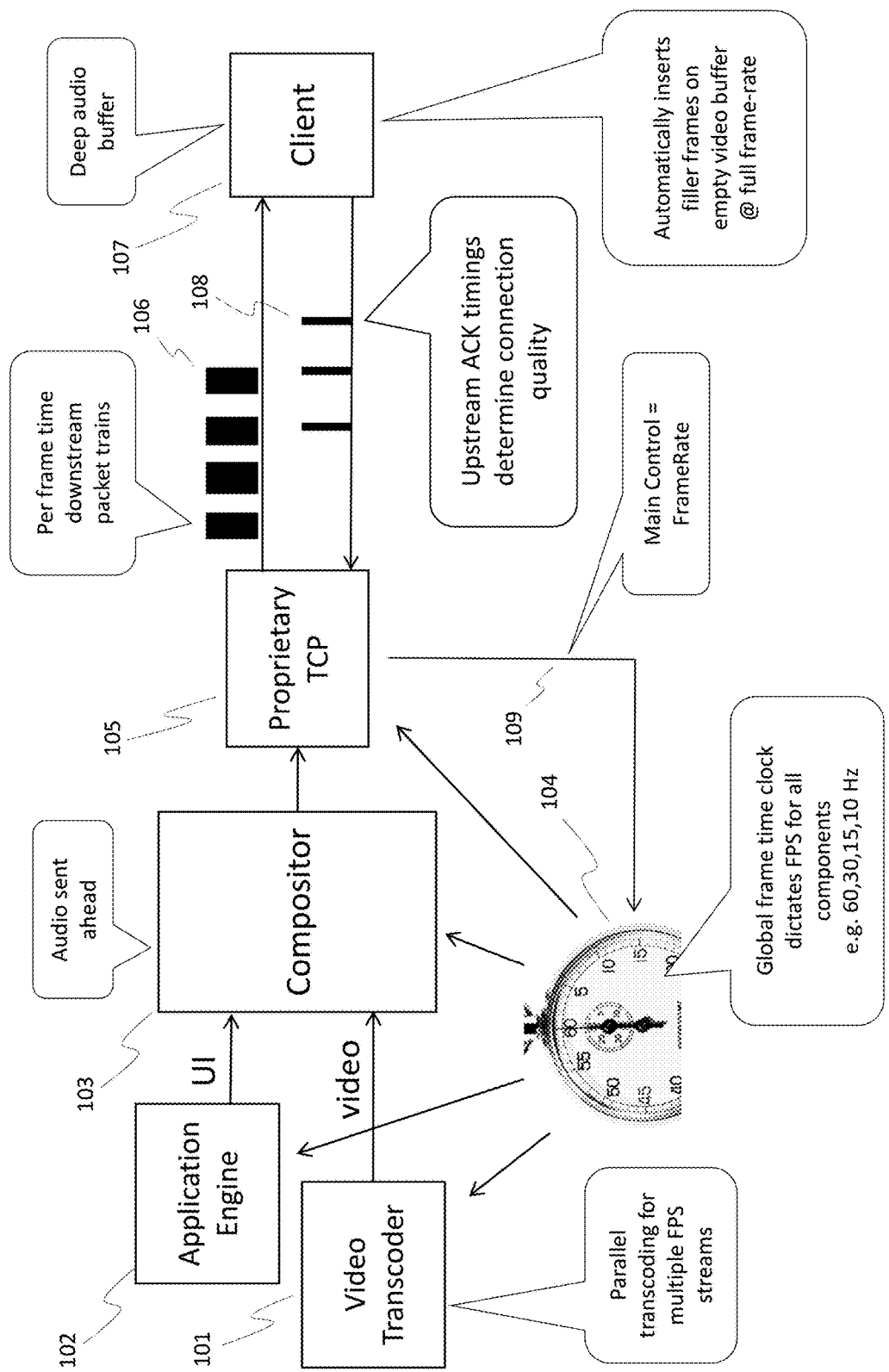
FIG. 1A is a schematic according to some embodiments of an interactive television (ITV) application server, client device, and distribution network elements for exploiting adaptive bit rate communications over an unmanaged network such as the Internet.
Figure 1B:
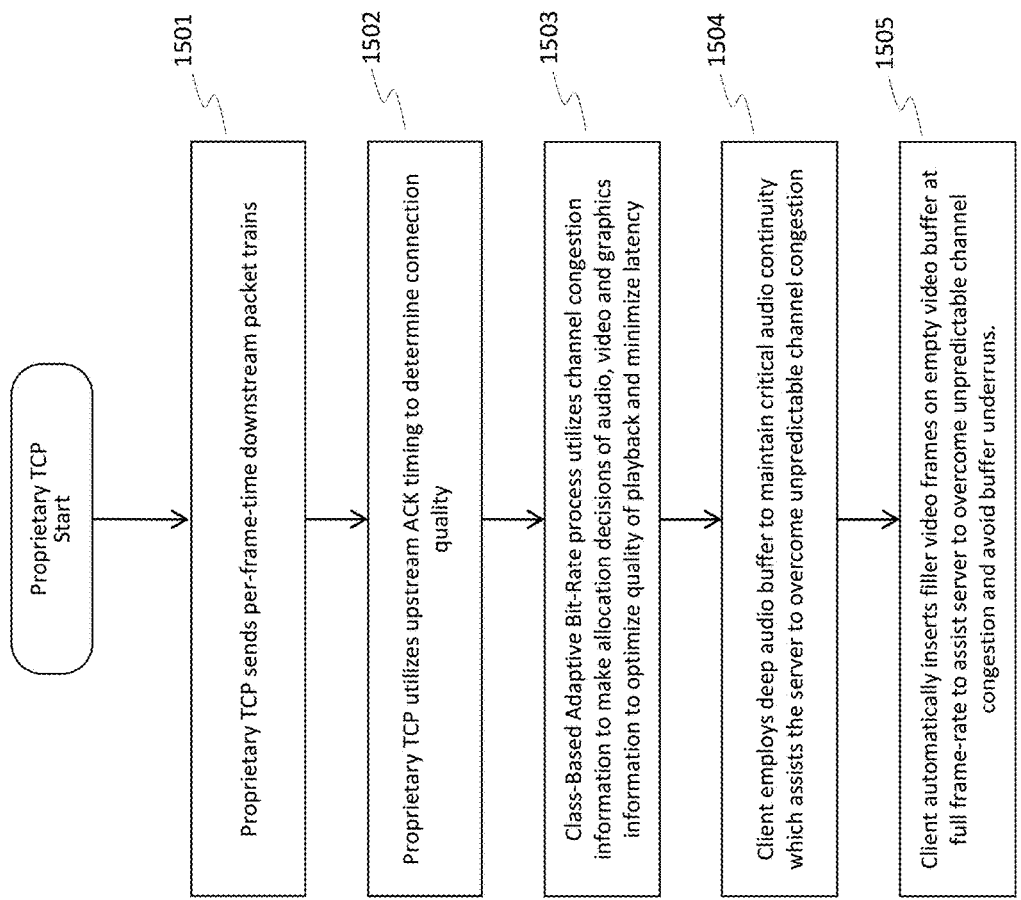
FIG. 1B is a flow chart according to some embodiments of a method of testing network congestion and mitigating its effects on a client device that is interacting with an interactive television (ITV) application server, in accordance with some embodiments.

Quality of service for the delivery of digital media over an unmanaged network is optimized by exploiting a class-based management scheme to control an adaptive bit-rate network multiplexer. FIG. 1A depicts such a system in accordance with some embodiments. The system includes a video transcoder 101, application engine 102, compositor 103, global frame time clock 104, proprietary TCP component 105, unmanaged downstream 106 and upstream 108 communication channel (e.g., the Internet), and client firmware 107. The client firmware 107 runs on a client device. The video transcoder 101, application engine (i.e., application execution engine) 102, compositor 103, global frame time clock 104, and proprietary TCP component (i.e., stack) 105 are situated on (e.g., run on) a server system (e.g., at a cable television headend).

The compositor 103 composites fragments and video streams from various sources such as, but not limited to, the application engine 102, which generates fragments representing UI updates, and the transcoder 101, which transcodes video assets into composite-able assets. Feedback 109 from the proprietary TCP component 105, obtained through TCP's acknowledgment mechanism over the upstream channel 108, is used to determine a global frame time clock 104.

Figure 4:
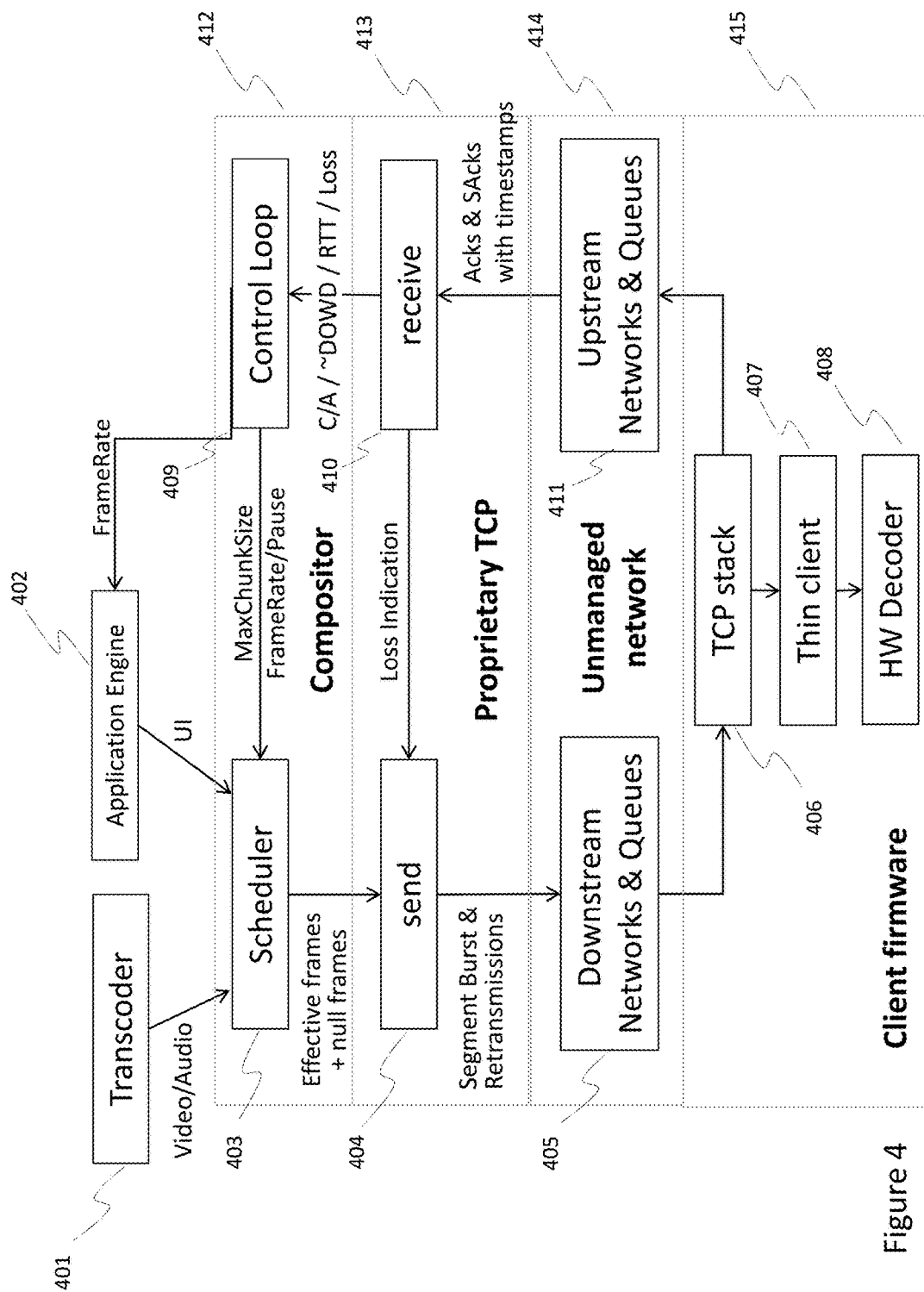
FIG. 4 is a schematic according to some embodiments of an interactive television (ITV) application server and client device depicting distribution network elements.

FIG. 4 depicts a more detailed decomposition of the system of FIG. 1A, in accordance with some embodiments. It includes the same components: a transcoder 401, an application engine 402, a compositor 412, a proprietary transport such as TCP 413, an unmanaged network 414 such as the Internet, and client firmware 415. In some embodiments, FIG. 1A's frame rate feedback signal 109 is derived by a control loop 409 in the compositor 412 from information passed from the transport receive process 410 to the control loop 409. The control loop 409 and a scheduler 403 (also in the compositor 412) optimize the composited stream within the optimization space of FIG. 2A or 2B.

Figure 2A:
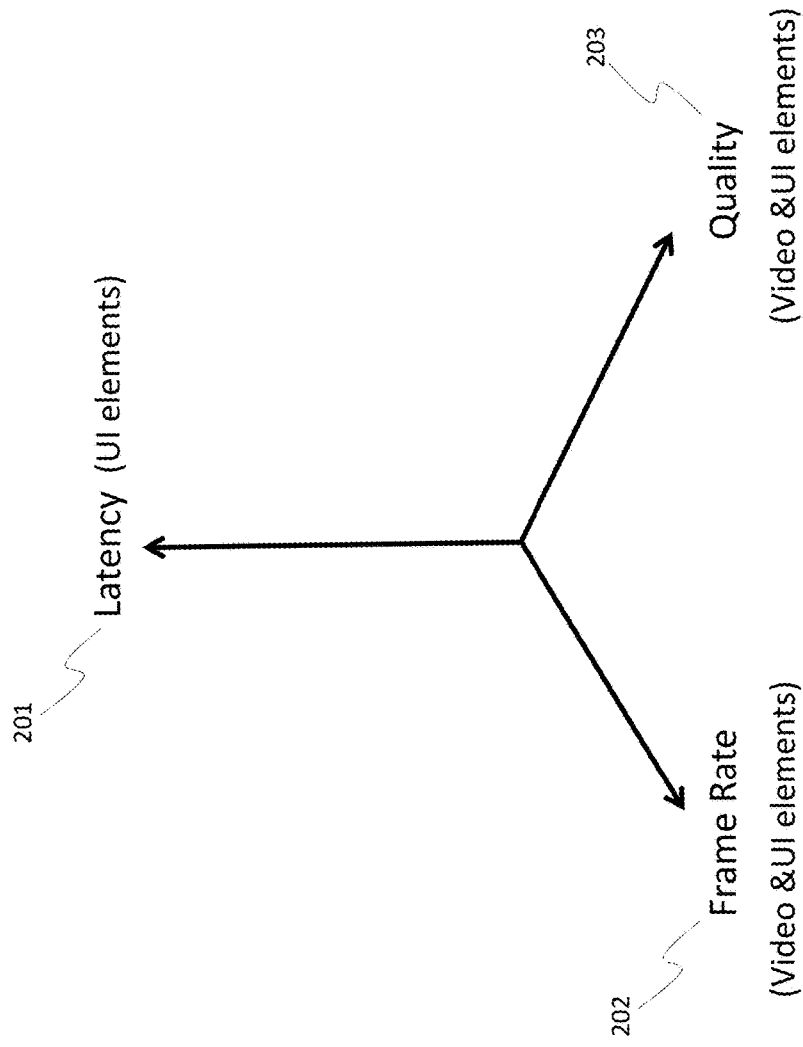
FIG. 2A is a multi-dimensional control graph showing decision paths for multiplexing audio, video and graphical user interface (UI) elements, according to some embodiments. Each dimension indicates which components of the user experience can contribute bandwidth for use by other components while minimizing the perceptual degradation of the composite user front-of-screen experience.
Figure 2B:
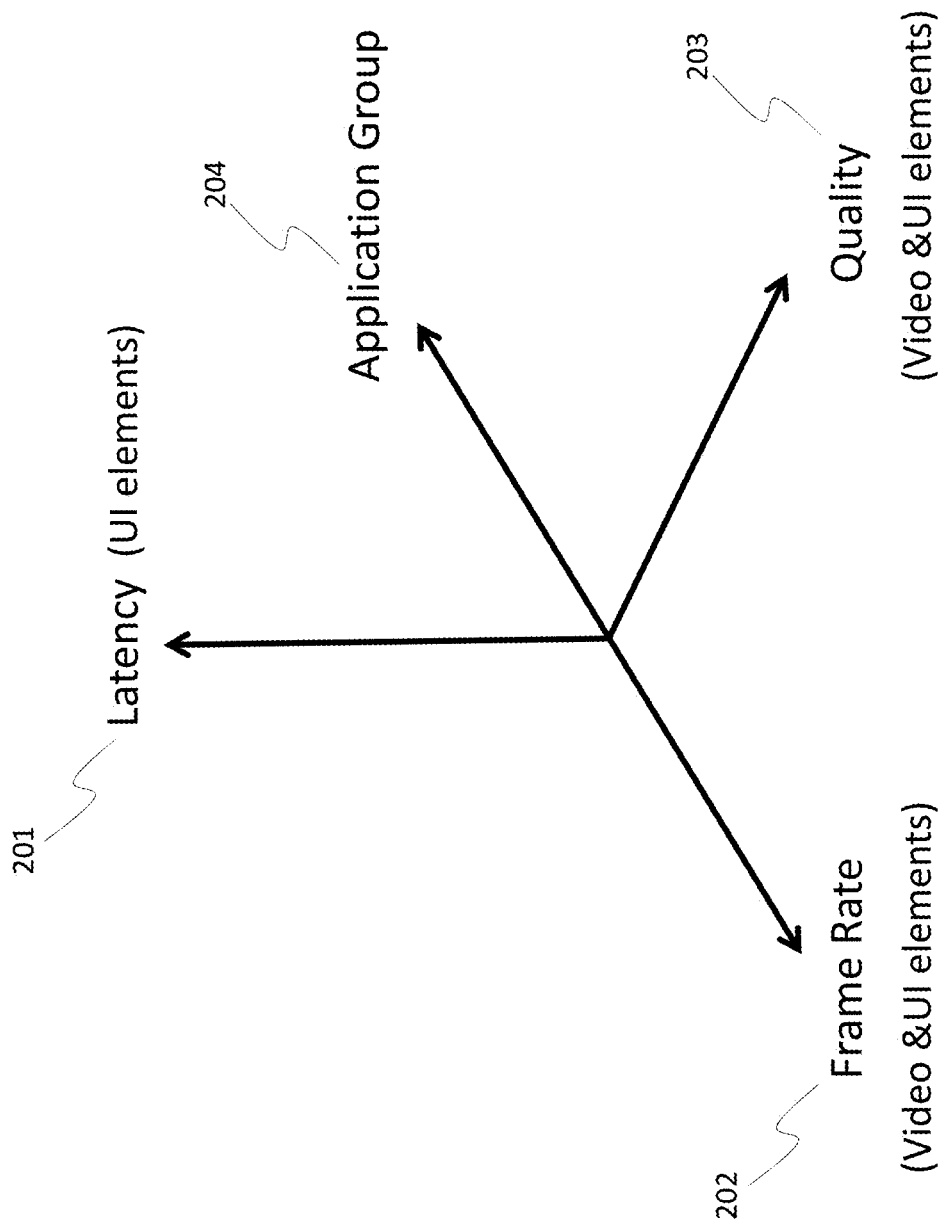
FIG. 2B is a multi-dimensional control graph showing decision paths as in FIG. 2A with the additional decision dimension of entire application groups, in accordance with some embodiments.

FIG. 2A is a three-dimensional control graph showing decision paths for multiplexing audio, video and graphical user interface (UI) elements, according to some embodiments. Each dimension indicates which components of the user experience can contribute bandwidth for use by other components while minimizing the perceptual degradation of the composite user front-of-screen experience. The three dimensions are latency 201, frame rate 202, and quality 203. The three-dimensional decision logic thus may adjust (i.e., trade off) frame size versus frame rate (latency) versus frame quality (quantization). In some embodiments the control logic of the scheduler makes decisions based on trading-off frame size for frame rate, which affects latency, or further trades image quality for either of, or a combination of, frame size and frame quality. A diagrammatic representation of this decision logic may be seen in FIG. 2A showing the multi-dimensional control logic trading off Latency 201, Frame Rate 202, and Quality 203. FIG. 2B is a four-dimensional control graph showing decision paths as in FIG. 2A above with the additional decision dimension of application groups 204.

Conventional systems typically trade picture quality 203 for bitrate, but this does not yield satisfactory results in the disclosed system. The system of FIG. 4 combines graphical user interfaces with video. The end-user experience with respect to user interface portions of the screen benefit from low-latency, high-quality, and error-free updates. At the same time, the video signal is best served by smooth, uninterrupted playback, although quality should not be degraded too much or the picture becomes blocky or distorted. Tests on end-user experience have shown that trading frame rate 202 and latency 201 (FIGS. 2A-2B) for bit rate may actually result in a better experience than using quality. Statistics received from the proprietary TCP component 413 are provided as input to the control loop 409. Examples of such statistics include:

Capacity (C),
Available bandwidth (A),
Average Delta One Way Delay (~DOWD),
Round Trip Time (RTT), and
Loss rate.

Based on these inputs the control loop 409 calculates a frame rate, maximum chunk size, and pause signal that are provided as input to the application engine 402 and scheduler 403. For example, the frame rate is provided to the application engine 402, while the frame rate, maximum chunk size, and pause signal are provided to the scheduler 403.

In some embodiments, the application engine 402 uses the frame rate to adapt to variable bandwidth conditions. A reduction in frame rate by a factor 2 roughly yields a similar reduction in bit rate for an equivalent picture quality. The fragments from the application engine 402 may use a fixed quantization parameter to keep quality uniform across the interface. The output of the application engine 402 is therefore generally more peaky than that of a typical video asset because the fragments may use these fixed quantization parameters instead of being rate controlled.

In some embodiments, the transcoder 401 may have video assets in different frame rates flavors instead of quality levels. Video assets may be transcoded ahead of time and adaptability to various bandwidth conditions is achieved by transcoding a video asset in multiple bit-rate flavors (i.e., using multiple bit rates). In conventional systems, a reduction in bitrate is typically achieved by increasing the quantization of the coefficients that constitute the video frames. The result of this increase in quantization is a reduction in picture quality generally perceived as ringing, contouring, posterizing, aliasing, blockiness or any combination thereof, especially in scene changes. Instead of reducing the quality of the video and maintaining the frame rate, in some embodiments the frame rate is reduced and the quality maintained to achieve a similar reduction. The advantage is that for varying bandwidth conditions, the quality of the video remains the same albeit at a different frame rate. Another advantage is that by having a choice of frame rate options for video assets, the scheduler 403 can tradeoff UI latency for video frame rate.

In some embodiments, the transport component 413 employs an UDP-like streaming behavior with TCP semantics. The advantage of using the TCP protocol's semantics is that the client can run a standard TCP/HTTP protocol implementation. Using the TCP protocol also allows for easier traversal of NAT routers and firewalls that are often found in the last mile. The disadvantage of standard TCP is that it is generally not well suited for real-time, low-delay streaming because of its random back-off, fairness and retransmission properties. Therefore, in some embodiments the server system does not adhere to typical TCP behavior such as the slow start, congestion window, and random back-off, and instead sends segments in a way that suits the described real-time streaming requirements, while maintaining enough compliancy (such as following TCP's receive window and retransmission rules) to be able to use standard TCP client implementations.

The transport component 413 may have a send process 404 and a receive process 410. The send process 404 sends scheduled chunks as bursts of TCP segments, without regards to traditional TCP fairness rules, and retransmits lost segments as mandated by the TCP protocol upon loss indications from the receive process 410. The receive process 410 processes TCP acknowledgments (ACKs) and selective acknowledgments (SACKs) and timestamps pertaining to the segments sent by the send process 404. RFC 1323 describes TCP timestamps. In standard TCP implementations, the TCP timestamps are used in an algorithm known as Protection Against Wrapped Sequence numbers (PAWS). PAWS is used when the TCP window size exceeds the possible number of sequence numbers, typically in networks with a very high bandwidth/delay product. In some embodiments, the timestamps are used to determine server-side the link's capacity and available bandwidth by leveraging the fact that the burst transmission timespan can be compared to the client-side reception timespan. Conventional systems have algorithms that use these delta one way delays to derive the link's capacity and, by varying the exact timing of the segments in the burst, make an approximation of the available bandwidth. Instead of using special probe data to determine these statistics only at the start of a session, the server system uses the audio and video data itself to continuously measure changes in the link's capacity and available bandwidth by means of reading the time stamps of the returning TCP ACKs from the burst of TCP packets to the client. This measurement of return ACKs provides a means to determine network latency and congestion allowing for more accurate use of available bandwidth.

The same mechanisms can be implemented on top of standard UDP instead of TCP, assuming packet loss is handled by standard mechanisms such as Forward Error Correction or retransmissions.

An unmanaged network 414 (e.g., the Internet), is the environment over which the described system is designed to work. Such a network is typified by a plurality of downstream networks with queues and associated properties 405 and upstream networks with queues and associated properties 411. The downstream and upstream networks are generally asymmetrical with respect to capacity, available bandwidth and latency properties. The disclosed system assumes no prior knowledge over the properties of the unmanaged network, other than that variable latency, loss and reordering are assumed to occur. Some links, such as Wi-Fi links, may also exhibit temporary loss of all connectivity.

The client device running the client firmware 415 may be a broadband-connected set-top box, a broadband-connected television, a computer, or any other device. In some embodiments, the client device has a standard TCP client implementation 406, a thin client implementation 407, and an audio/video decoder 408 (e.g., that may decode MPEG-2, H.264/MPEG-AUDIO, AC3 or AAC video/audio streams).

Figure 10:
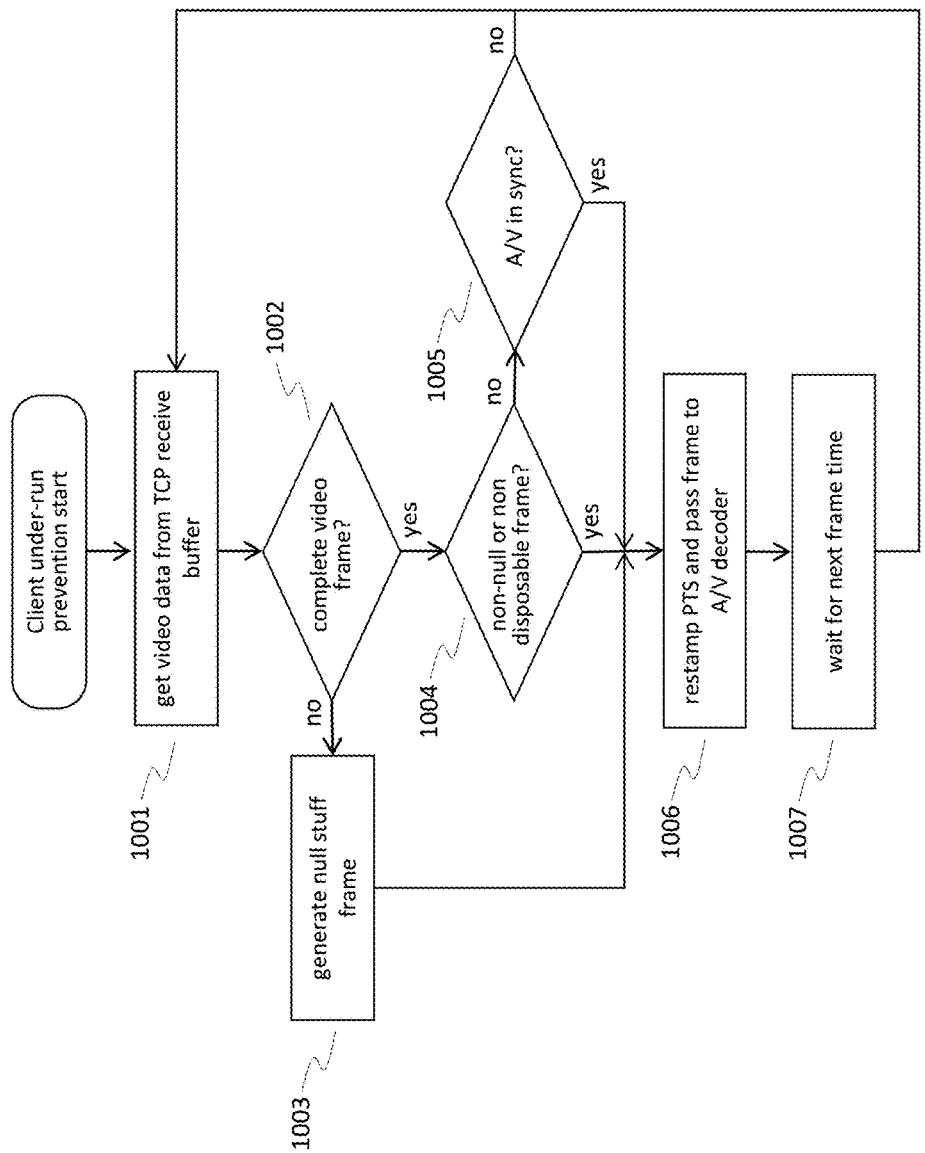
FIG. 10 is a flow chart depicting a method of stuffing the video decoder with null frames to prevent video buffer decoder under-run.

In some embodiments, the audio/video decoder 408 is a hardware decoder. Typically, hardware decoders rely on a constant stream of audio/video data and do not handle buffer under-runs very well. Therefore, the thin client implementation 407 may implement methods to prevent under-run, such as the method of FIG. 10. In the method of FIG. 10, the client injects the hardware decoder buffer with null-frames as needed to maintain the health of the decoding chain. These null-frames may be inter- or temporal encoded frames that only consist of skip macroblocks or macroblocks that do not change the reference frame. The null-frames may also be disposable, so that the state of the decoder does not change. If null-frames were inserted, the thin-client may compensate by later removing similar null-frames from the video stream. During the period that there are more frames added than removed, the client may have to apply a timestamp compensation mechanism (such as re-stamping the presentation time stamps (PTSs)) to keep the hardware decoder's timing mechanism satisfied.

The method of FIG. 10 begins with video data being retrieved (1201) from the TCP receive buffer. If the video data is not a complete video frame (1202-No), a null frame is generated (1203) and injected (i.e., stuffed) into the hardware decoder buffer, and the method proceeds to operation 1206, discussed below. If the video data is a complete frame (1202-Yes) and is not a non-null or non-disposable frame (1204-No), it is determined whether audio and video are in sync (1205). If audio and video are not in sync (1205-No), the method returns to operation 1201. If audio and video are in sync (1205-Yes), or if the video data is a non-null or non-disposable frame (1204-Yes), then the PTS is restamped (1206) and the frame is passed to the decoder. The method then waits (1207) for the next frame time and returns to operation 1201.

The compositor 412 may generate transport streams with a system frame rate of 29.97 Hz for NTSC systems or 25 Hz for PAL systems. When the compositor 412 is said to change to another frame rate, it is the effective frame rate that may be changed. The effective frame rate is the rate with which the display changes, as opposed to the system frame rate, which is the rate at the frame clock advances. If the effective frame rate is lower than the system frame rate, the compositor may output intermediate null-frames in between frames that carry data that change the display. Suppose the system frame rate is 30 Hz and the effective frame rate is 15 Hz. In this case the compositor may output the following frames; E0-N1-E2-N3-E4-N5, where Et denotes an effective frame at system frame time t and Nt denotes a null frame at system frame time t. This can be arbitrarily extended to any effective frame rate (e.g., E0-N1-N2-E3-N4-N5 for 10 Hz and E0-N1-N2-N3-E4-N5 for 7.5 Hz).

The client firmware 415 may remove null-frames to compensate for earlier null-frames it introduced as instructed by the server. When the effective frame rate equals the system frame rate the stream may not have frames that can be removed. It is therefore advantageous to always have a system frame rate that is double the maximum effective frame rate. For a NTSC system the system frame rate may be 59.94 Hz and for PAL the system frame rate may be 50 Hz, although the maximum effective frame rate of transcoded assets is 29.97 Hz or 25 Hz respectively.

Another reason to use a system frame rate that is higher than the maximum effective frame rate may be to allow for more freedom in resampling video assets from film or cinema rate to the system frame rate. Conversely, converting assets from 29.97 Hz to 25 Hz and vice versa may yield better results when the system frame rate is higher and frames can be scheduled closer to their original frame time.

In some embodiments of the invention, the higher system frame rate may be used to separate video material from user interface material. This may be achieved server side by using the even frames for encoded video, while using the odd frames for composited user interface fragments (or vice versa). The advantages of this approach would be a reduced compositing overhead and the fact that the video may use encoding parameters that are incompatible with the fragment compositing process employed for the user interface fragments (For example, an embodiment that uses H.264 may use CABAC for encoding the video assets while using CAVLC for the composited fragments.), resulting in higher quality video.

In some embodiments of the invention, the concept of alternating video and user interface frames may also be used to retrieve and decode an out-of-band video asset. Additional benefit of such an approach is that for the video stream a progressive download of the asset can be used in combination with low latency server side encoded user interfaces. In some embodiments, the user interface and video share the same latency. It is not possible to send ahead video data without additional complexity on the client. If a system does send ahead video data, the client may be required to change timestamps to correct playback. However, tolerance with respect to varying link conditions would improve if the audio and video could be decoupled from the user interface and be buffered as in a normal progressive download system.

In some embodiments, this decoupling may be partially achieved by sending ahead audio. Discontinuities in audio playback are much more noticeable than temporary disruptions in video. The user experience is considerably enhanced if a few hundred milliseconds of audio were available to bridge temporary loss in connectivity. The system may send ahead audio, because audio and video can be synched via timestamps. At the client, audio-video sync may be achieved by matching audio timestamps with video timestamps. Therefore, it is not a problem to send ahead audio up to a certain amount. This way, a certain degree of connectivity robustness and a continuous user experience is achieved without a latency penalty, which would otherwise spoil the interactive experience for the user.

In the event of a temporary disruption of link connectivity, the audio and video may become out of sync because the audio keeps playing while the video buffer may under-run. To alleviate this problem, the thin client 407 may use a null-frame stuffing/removing mechanism as has been described.

Audio may also be sent ahead over a separate logical or physical connection.

As has been described, the compositor 412 may use frame rate and latency instead of, or in addition to, picture quality to adapt the audio/video streams and user interface to the available bandwidth. Adapting by changing the quantization of the coefficients is well-known. Adaptability using latency and/or frame rate is best described by example.

Figure 5:
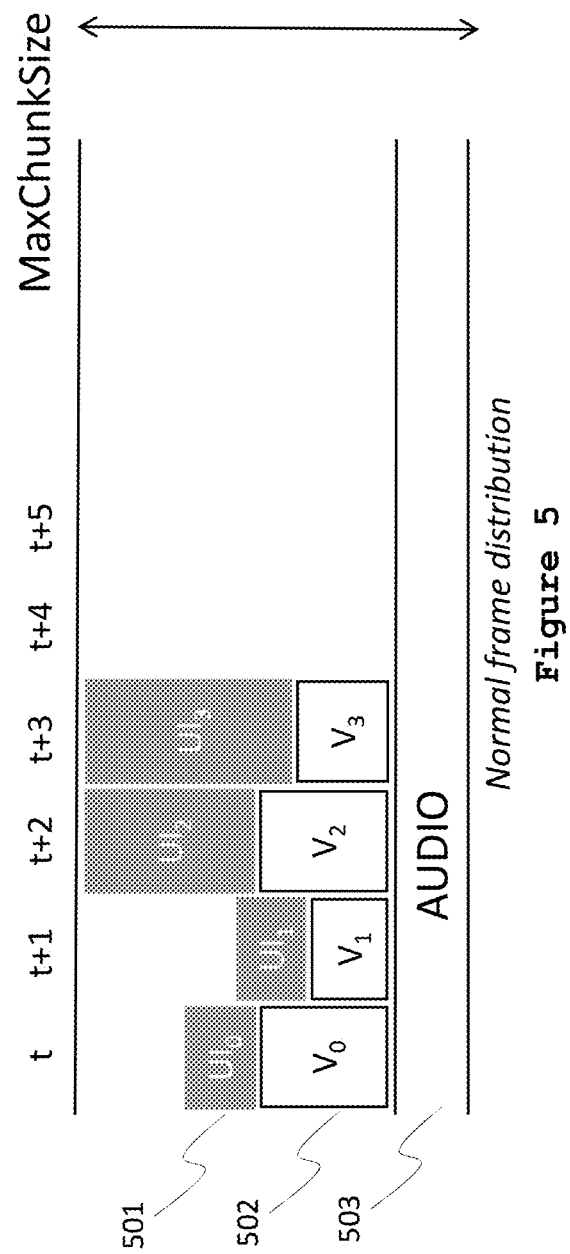
FIG. 5 is a time-flow diagram of class-based allocation for a frame distribution of UI, video elements and audio with adequate bandwidth.

In some embodiments, an interactive application includes a user interface with a partial-screen video stream. FIG. 5 depicts the situation where the bandwidth required for the composited user interface 501, video stream 502 and audio stream 503 fits the available bandwidth as expressed by the MaxChunkSize. (The MaxChunkSize is the maximum chunk in bytes the system uses for a given frame rate.) From frame times t through t+3, the aggregate bandwidth for these three sources that make up the stream never exceeds the maximum chunk size for the system frame rate and no policy decision has to be made.

Now suppose that the aggregate bandwidth does not fit (i.e., exceeds the maximum chunk size) because, for example, a user interface update at t is too big to fit the budget. Audio is typically a fixed component and the user experience benefits from uninterrupted audio playback. Therefore a policy decision has to be made whether to give precedence to the user interface update or the video stream.

Figure 6:
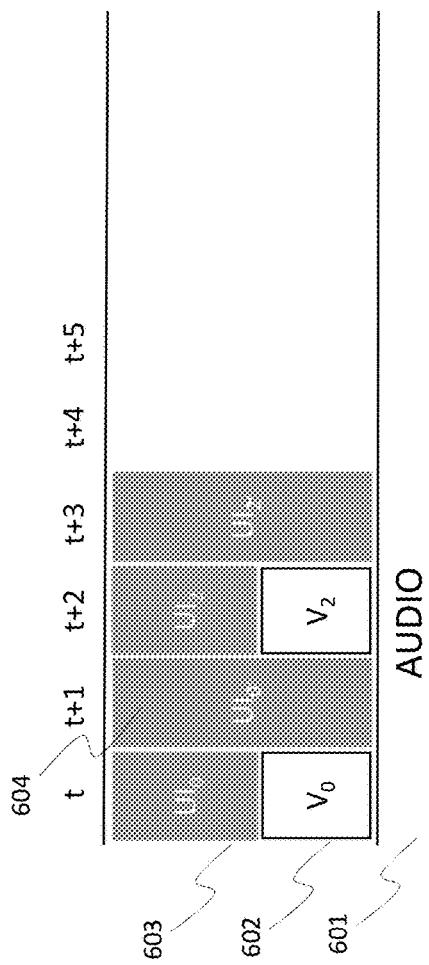
FIG. 6 is a time-flow diagram of class-based allocation, illustrating a constrained bandwidth allocation mitigated by reducing the frame rate of certain video elements, allowing UI and audio to pass unchanged, in accordance with some embodiments.

If the user interface update is the result of the user interacting with the system, it may be assumed that low latency of the response is more important than maintaining video frame rate. An example of how this works out is depicted in FIG. 6. The user interface update, consisting of chunks 603 and 604 may be spread over t and t+1 and the video frame at t+1 may be skipped to make enough room. For sustained oversubscription (for example when the user interface animates for a number of frames), this allocation scheme may be repeated resulting in a similar strategy at t+2 and t+3. Because audio is fixed, no change is made to the scheduling of audio data.

Figure 7:
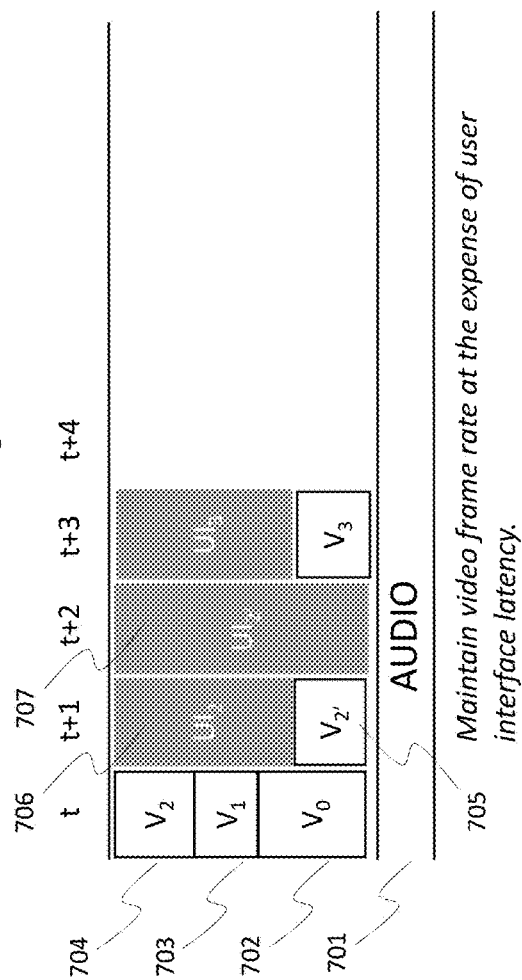
FIG. 7 is a time-flow diagram of class-based allocation, illustrating a constrained bandwidth allocation mitigated by maintaining the video frame rate at the expense of user-interface latency, in accordance with some embodiments.

If the user interface update is not the result of the user interacting but, for example, is application-timer induced, it may be assumed that the user is watching the video stream and it may be beneficial for the user experience to maintain the video frame rate and delay the user interface. Such a scenario is depicted in FIG. 7. In this scenario audio 701 and the first video frame 702 are scheduled as before. However, instead of sending the frame representing the user interface update at t, video frames $V_1$ 703, $V_2$ 704, and $V_2$, 705 are sent ahead and a user interface update is delayed until enough bandwidth is available to send the complete update. The trivial implementation of this strategy would generate $UI_0$ as in FIGS. 6 (603 and 604), however, a more optimal user experience is achieved by extrapolating the update at t to the time where the frame is actually displayed, which may be t+2 and therefore the figure depicts $UI_2$.

The examples of FIGS. 5 to 7 assume that the effective frame rate before adaptation equals the system frame rate. It should be noted, though, that this does not necessarily need to be; the policy decision can be made for every effective frame rate as long as there's a lower video frame rate available. If this is not the case, the system always has the option to delay the user interface graphical elements.

Figure 8:
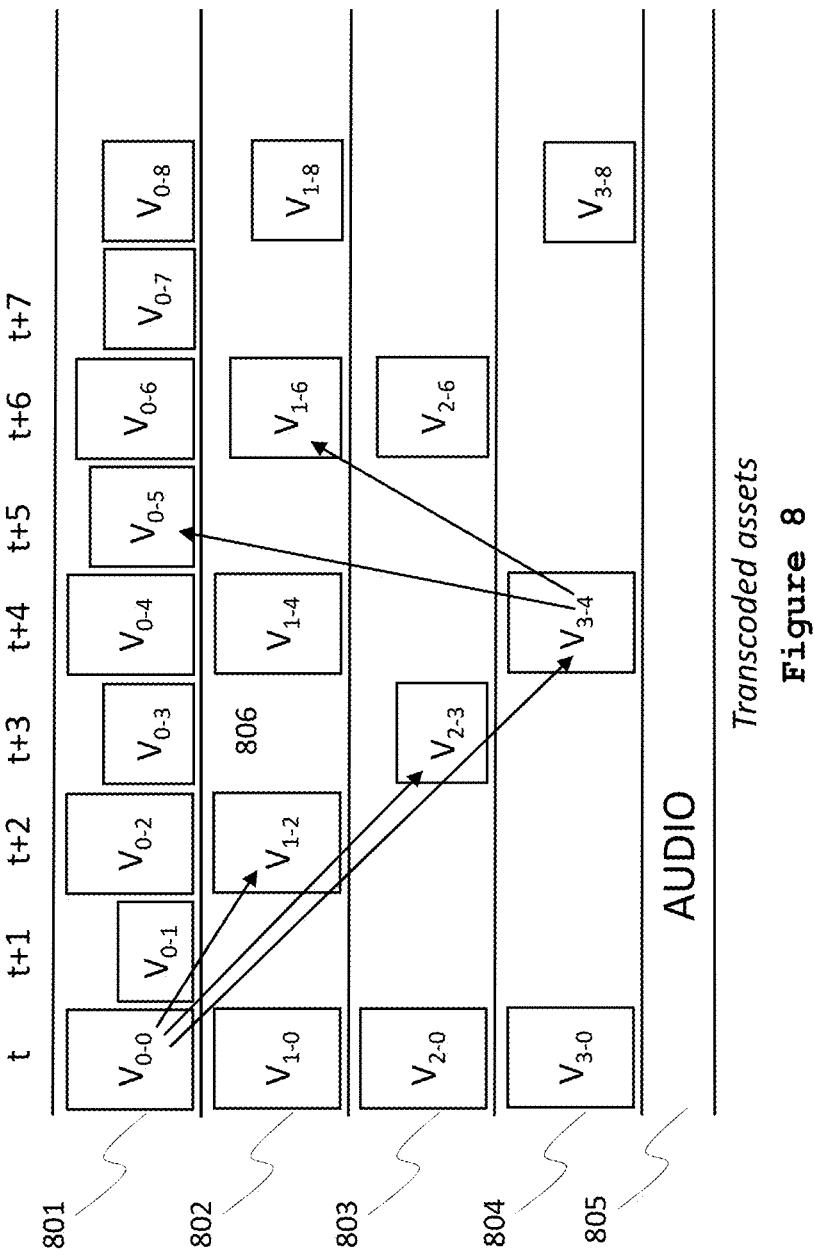
FIG. 8 is a time-flow diagram depicting a multi-framerate encoding of a video stream transcoded at four video frame rates and depicting an example of transitioning from one framerate to another at only certain transition times that represent valid encoding sequence transitions.

Video frames may be sent ahead because the video streams may be pre-transcoded or real-time transcoded video assets that have been transcoded at least a few frames ahead of time. The structure of a typical multi-frame-rate video asset is depicted in FIG. 8. It contains multiple (e.g., four) video streams 801-804 at distinct, respective frame rates (e.g., full, half, third and quarter, respectively) and an audio stream. To save on resources to transcode and store assets, the lower frame rate assets may only be available in a single or limited number of permutations. For example, the half-frame-rate is only available in even frames; the odd frame permutation may be omitted. This means that it is not always possible to switch from one frame rate to another instantaneously. For example, at time t the compositor 412 can switch from full frame rate $V_{0-0}$ to $V_{1-2}$, $V_{2-3}$, and $V_{3-4}$ because they all encode the difference to an equivalent frame at time t. At time t+4, however, the compositor can only return to full frame rate or half frame rate because the third frame rate does not have a frame that transcodes the transition from the picture at times t+4 to t+n.

An advantage of reducing frame rate instead of reducing picture quality is that frames at a particular time t are more or less equivalent; they represent roughly the same picture. Especially for scene changes this is a considerable advantage because it is typically at scene changes that blocking artifacts become very apparent. As has been noted before, a reduction in frame rate by 2 yields a reduction in bitrate by 2 for an equivalent picture quality. It should be noted, though, that equivalent frames may not be identical for different frame rates. Due to the intricacies of the block based encoder and its quantization process, the exact pixel values depend on the exact sequence of intra and inter prediction and quantization process. Switching from one frame rate to another may introduce small errors, albeit much smaller than when switching between streams of different quality. An appropriate intra refresh process may be applied to alleviate a buildup of these small errors.

The concept of the effective frame rate is also used by the transport. As has been outlined in FIGS. 5-7, data of one or more composited frames is aggregated in a chunk of up to MaxChunkSize and sent. The MaxChunkSize is determined by the control loop component and may be derived from the capacity or available bandwidth and frame rate. A simple example of how to derive MaxChunkSize is given below.

Assume Bapp (in bits per second) is the bit rate at which an application is specified to work full frame rate, with system frame rate Fs (in frames per second). Then the following may hold:

$$\text{MaxChunkSize}=(Bapp/Fs)/8$$

If the available bandwidth or capacity exceeds Bapp, the effective frame rate Fe may be equal to Fs. Or, half that of Fs if system is to benefit from the advantages outlined before. If the available bandwidth or capacity is less than Bapp, the control loop may decide to either shrink the MaxChunkSize or change the effective frame rate to the next available divider. In some embodiments, the effective frame rate may be changed. The advantages of maintaining the bit budget for individual frames and reducing the frame rate have been outlined for picture quality, but the advantage also extends to the transport; by reducing frame rate instead of picture quality, the average amount of data per frame remains the same for varying bitrates. For efficiency reasons it is advantageous to always send the data in the chunk using the maximum TCP segment size. Since the transport derives statistics per segment, reducing the amount of data would reduce the amount of segments over which statistics can be derived. Unless, of course, the segment size is reduced.

Maintaining a relatively high number of segments from which to derive statistics is important because clients may have limited TCP timestamp properties. RFC 1323 does not specify the units in which the timestamps are expressed, nor the resolution of its updates. Tests have shown that common timestamp granularity (the resolution at which different segments can be distinguished from each other) range from one millisecond up to ten. A typical TCP segment for a typical Internet connection to the home may carry approximately 1450 bytes of data. A typical Bapp setting for BCD sessions may be for example 6 Mbps, at which a TCP segment takes roughly 2 milliseconds. (Assuming that the link's capacity roughly equals Bapp.) A timer granularity of 10 milliseconds roughly equates to 5 segments, which is not enough to directly derive any useful statistics.

In the disclosed system, the transport 413 increases accuracy of the measurements by building a histogram of arrival times. Suppose a client has a timestamp granularity of 10 milliseconds. The first segment in a frame marks the first histogram slot 0. The timestamps of any subsequent segments are subtracted by the timestamp of this first slot, adding to the histogram's slot 0,1, . . . ,n. Note that the arrival of the first segment is typically not synchronized with the slot timing. Therefore, a typical histogram for 12 segments may look like (where # denotes a segment):

0: ###
1: ######
2: ###
3:

Histograms like these may be used to derive a number of network properties and conditions, some of which are specified below.

If the departure constellation (the intervals between the segments) of the segments was sufficiently dense, that is, the segments were transmitted as a burst with minimal inter segment intervals, the capacity of the narrow link, the link with the lowest capacity, may be derived from the slot with the largest number of hits.

If the width of the histogram of a dense departure constellation exceeds the number of slots expected within an effective frame time (four for NTSC at 30 frames per second, because the first and last slot are arbitrarily aligned to the arrival constellation), the stream may either be exceeding the capacity:

0: ##
1: ###
2: ###
3: ###
4: # or may be experiencing intermittent network problems (such as latency due to Wi-Fi interference):

0: ###
1: ######
2: #
3:
4: ##

If the width of the histogram is lean (using only the first 2 slot), the system is not using the full capacity of the link:

0: ############
1: #
2:
3:
4:

The histogram approach may be used even if the client allows for a better timestamp granularity by artificially limiting the granularity to a granularity around 10-millisecond. For example, a common granularity of 4 milliseconds may be changed to 8 milliseconds slot times.

Artificially limiting the granularity may also be used to scale the algorithm to lower effective frame rates. For example, when the effective frame rate is halved, the granularity may be halved as well (e.g., from 10 milliseconds to 20 milliseconds). This effectively scales the algorithm with the effective frame rate; all proportions including average amount of data and number of segments, picture quality, semantics of histogram, and others remain the same while only the effective frame rate changes. Note, however, that if more accuracy is available, histograms can be arbitrarily recalculated to see whether a 'magnified' histogram yields more information. Timestamps may also be used directly, if granularity permits.

If the timestamp granularity is too low, RTT (round trip time) may be used as an alternative with the disadvantage that variations in upstream congestion may skew the results.

Throughout the disclosure, references have been made to capacity and available bandwidth. Capacity, from an end-to-end perspective, is the maximum aggregate bandwidth the narrow link is able to carry, where narrow link is the link with the lowest capacity. Available bandwidth, from the same perspective, is the unused capacity. Overflowing the capacity should be avoided, while overflowing the available bandwidth is a policy decision. The system continuously measures capacity and estimates an effective frame rate that will fit the capacity. By sending chunks as tightly spaced TCP segments (or bursts), the system is able to capture its share of the capacity and minimize latency. Coexistence with unmanaged protocols such as unmodified TCP may be achieved by the fact that interactive applications have a strong variable bit rate (VBR) profile and hardly ever fully use the MaxChunkSize. Any additional knowledge about available bandwidth may enhance the decision to either maintain the current effective frame rate or reduce it.

Figure 9:
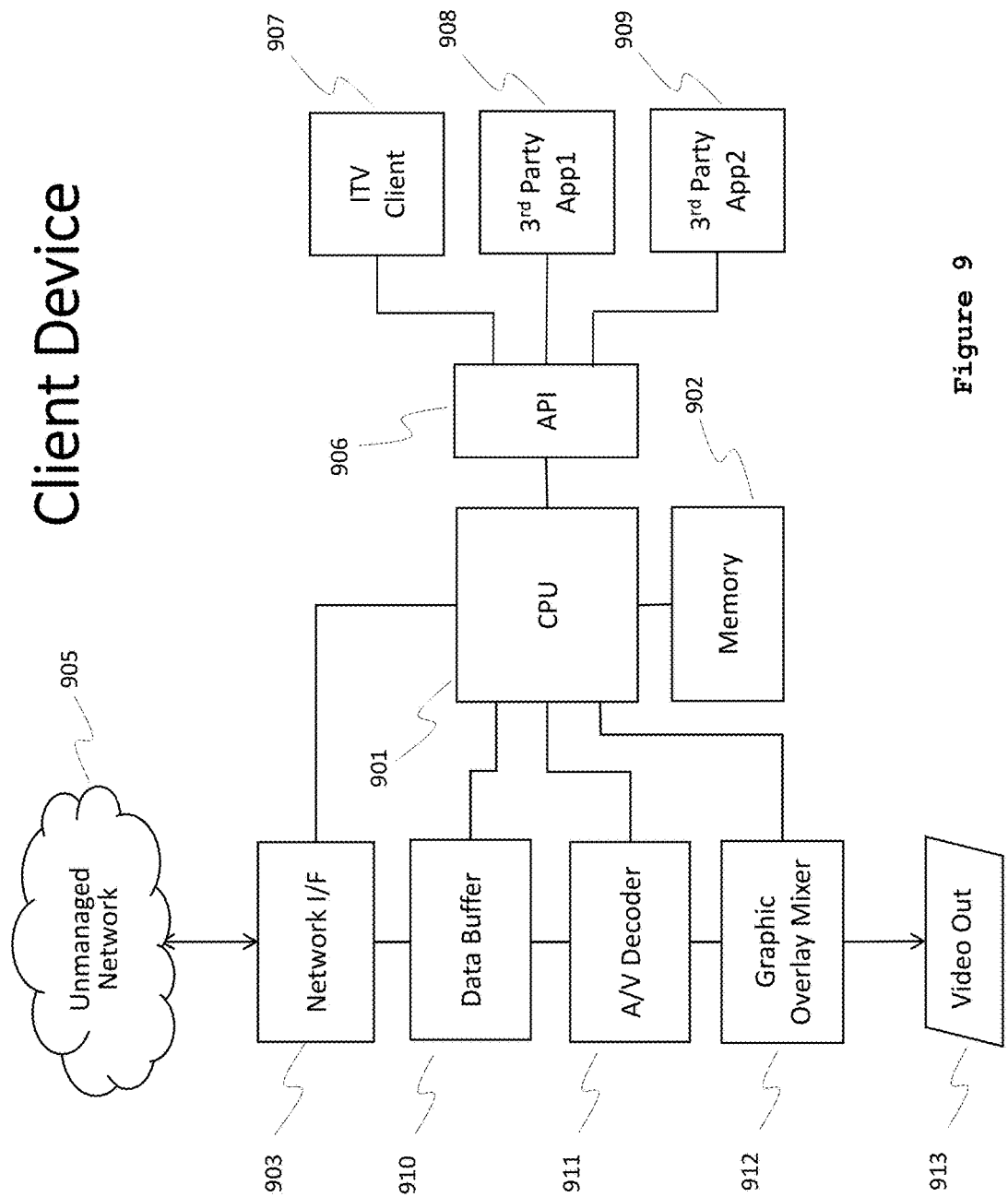
FIG. 9 is a schematic of a client device (e.g., a set-top box or smart TV host system) running an ITV client application and third-party applications.

In addition to on-demand feature files, more and more live cable television programming is moving to the Internet in addition to cable and satellite distribution. Internet-delivered (unmanaged network delivered) content is typically received via the equivalent of a cable or satellite set-top box. An example of this type of receiver is the processing capability built into contemporary smart TVs where, in addition to a standard TV tuner, the system of FIG. 9 is also implemented in the client device. And, in addition to a TV tuner selecting a television program to receive and display, the system of FIG. 9 receives data packets from an unmanaged network (the Internet) by means of a software programs running in the sub-system typically either installed by the manufacturer or downloaded into the smart TV by the user.

Typically, network-connected set-top boxes have components similar to those as are summarized in FIG. 9. The unmanaged network 905 is addressed, typically via the TCP/IP protocol via network interface 903, which feeds a data buffer 910. The audio, video and graphic components are decoded via audio/video (A/V) decoder 911 which feeds its output to graphic overlay mixer 912 which adds certain locally generated graphics and combines them with the video signal from A/V decoder 911 in accordance with information supplied to and associated with central processing unit (CPU) 901. Various third-party applications 907, 908, 909 in turn have access to the CPU 901 via the application program interface (API) 906. The result of received program information and locally generated information are mixed by the graphic overlay mixer 912 and output to the video display device as a video-out signal 913.

Figure 3:
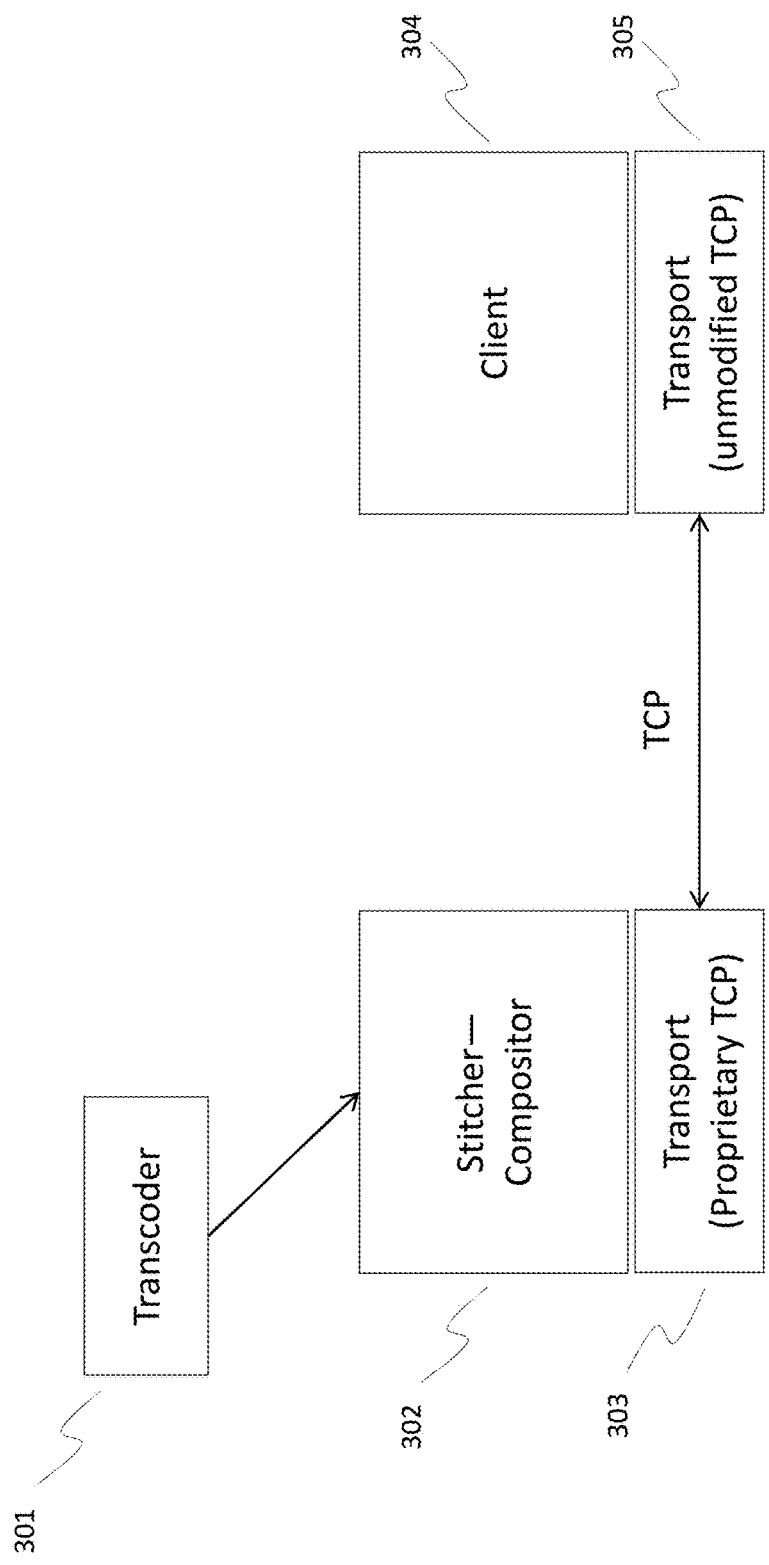
FIG. 3 is a schematic according to some embodiments of an interactive television (ITV) application server and client device depicting the base transport control protocol (TCP) used for communication between the server and the client device. The server exploits the disclosed proprietary (i.e., modified) TCP protocol while the client can advantageously receive the data stream by means of unmodified TCP.

FIG. 3 summarizes the invention by illustrating the path of video program information where Transcode 301 provides video and audio compatible with the client receiver 304 to the Compositor 302 to the Transport Multiplexer 303 that employs the inventions Proprietary TCP. The Client 304 needs only an unmodified TCP transport means 305 to beneficially receive and display program material via the invention. It is the class-based management of the audio, video and graphic components of 302 in concert with the network information (congestion) sensed via 303 that allows the novel means of the invention to optimally fill available channel bandwidth for the best quality and lowest latency delivery of interactive video content host on a remote server means over an unmanaged network.

FIG. 1A is a flowchart of a method of testing network congestion and mitigating its effects in accordance with some embodiments. The proprietary TCP stack send (1501) per-frame-time downstream packet trains (i.e., bursts) and utilizes the resulting upstream ACK timing to determine (1502) connection quality. A class-based adaptive bit-rate process utilizes channel congestion information to make (1503) allocation decisions of audio, video and graphics information to optimize quality of playback and minimize latency. The client employs (1504) a deep audio buffer to maintain critical audio continuity, which assists the server to overcome unpredictable channel congestion. The client automatically inserts (1505) filler video frames on an empty video buffer at full frame-rate to assist the server to overcome unpredictable channel congestion and avoid buffer underruns.

The functionality described herein may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of adapting content-stream bandwidth, comprising:
  generating a content stream for transmission over an unmanaged network with varying capacity;
  sending the content stream, via the unmanaged network, toward a client device;
  monitoring the capacity of the unmanaged network;
  determining whether an aggregate bandwidth of an upcoming portion of the content stream fits the capacity, wherein the upcoming portion of the content stream includes video content and user-interface data;
  in response to a determination that the aggregate bandwidth of the upcoming portion of the content stream does not fit the capacity:
    when the user-interface data is the result of a user interaction:
      prioritizing low latency for the user-interface data over maintaining a frame rate of the video content; and
      reducing a size of the upcoming portion of the content stream in accordance with the prioritizing, the reducing comprising decreasing the frame rate of the video content;

determining whether decreasing the frame rate of the video content sufficiently reduces the aggregate bandwidth of the upcoming portion of the content stream; and in response to determining that decreasing the frame rate of the video content does not sufficiently reduce the aggregate bandwidth of the upcoming portion of the content stream, decreasing a frame rate of the user-interface data.

2. The method of claim 1, wherein the upcoming portion of the content stream corresponds to a respective frame time.

3. The method of claim 1, wherein the reducing comprises decreasing the frame rate of the video content while maintaining a quality of the video content.

4. The method of claim 1, wherein:
the upcoming portion of the content stream further includes audio data; and
the reducing comprises sending the audio data ahead in a portion of the content stream that precedes the upcoming portion.

5. The method of claim 1, wherein the reducing further comprises spreading the user-interface data over the upcoming portion and a second portion of the content stream that follows the upcoming portion.

6. The method of claim 1, wherein:
the upcoming portion of the content stream further includes audio data; and
the reducing leaves the audio data unaffected.

7. The method of claim 1, wherein:
sending the content stream comprises sending bursts of TCP segments; and
monitoring the capacity of the unmanaged network comprises receiving acknowledgments of the bursts, the acknowledgments including timestamps, and using the timestamps to determine the capacity of the unmanaged network.

8. The method of claim 7, wherein using the timestamps to determine the capacity of the unmanaged network comprises:
building a histogram of arrival times in accordance with the timestamps; and
deriving the capacity from the histogram.

9. An electronic device, comprising:
one or more processors; and
memory storing one or more programs configured to be executed by the one or more processors, the one or more programs including instructions for:
generating a content stream for transmission over an unmanaged network with varying capacity;
monitoring the capacity of the unmanaged network;
determining whether an aggregate bandwidth of an upcoming portion of the content stream fits the capacity, wherein the upcoming portion of the content stream includes video content and user-interface data;
in response to a determination that the aggregate bandwidth of the upcoming portion of the content stream does not fit the capacity:
when the user-interface data is the result of a user interaction:
prioritizing low latency for the user-interface data over maintaining a frame rate of the video content; and
reducing a size of the upcoming portion of the content stream in accordance with the prioritizing, the reducing comprising decreasing the frame rate of the video content;
determining whether decreasing the frame rate of the video content sufficiently reduces the aggregate bandwidth of the upcoming portion of the content stream; and
in response to determining that decreasing the frame rate of the video content does not sufficiently reduce the aggregate bandwidth of the upcoming portion of the content stream, decreasing a frame rate of the user-interface data.

10. A non-transitory computer-readable storage medium storing one or more programs configured for execution by an electronic device, the one or more programs comprising instructions for:
generating a content stream for transmission over an unmanaged network with varying capacity;
monitoring the capacity of the unmanaged network;
determining whether an aggregate bandwidth of an upcoming portion of the content stream fits the capacity, wherein the upcoming portion of the content stream includes video content and user-interface data;
in response to a determination that the aggregate bandwidth of the upcoming portion of the content stream does not fit the capacity:
when the user-interface data is the result of a user interaction:
prioritizing low latency for the user-interface data over maintaining a frame rate of the video content; and
reducing a size of the upcoming portion of the content stream in accordance with the prioritizing, the reducing comprising decreasing the frame rate of the video content;
determining whether decreasing the frame rate of the video content sufficiently reduces the aggregate bandwidth of the upcoming portion of the content stream; and
in response to determining that decreasing the frame rate of the video content does not sufficiently reduce the aggregate bandwidth of the upcoming portion of the content stream, decreasing a frame rate of the user-interface data.

11. The method of claim 1, wherein decreasing the frame rate of the video content comprises decreasing the frame rate to a half, third, or quarter of the frame rate of the content stream.

12. The method of claim 1, wherein decreasing the frame rate of the video content comprises transmitting even frames of the video content and omitting odd frames of the video content.

13. The method of claim 1, wherein the video content comprises a total number of frames and decreasing the frame rate of the video content comprises transmitting a fewer number of frames than the total number of frames.

* * * * *